United States Patent [19]
Sheiba

[11] Patent Number: 5,833,038
[45] Date of Patent: Nov. 10, 1998

[54] METHOD AND APPARATUS FOR BROADBAND EARTHQUAKE RESISTANT FOUNDATION WITH VARIABLE STIFFNESS

[76] Inventor: Lev Solomon Sheiba, 15540 Peach Leaf La., North Potomac, Md. 20878

[21] Appl. No.: 678,710

[22] Filed: Jul. 11, 1996

Related U.S. Application Data

[63] Continuation-in-part of Ser. No. 551,655, Nov. 1, 1995, abandoned, Ser. No. 609,232, Mar. 1, 1996, abandoned, and Ser. No. 809,546, Mar. 19, 1997.

[51] Int. Cl.$^6$ ............................................. F16F 7/10
[52] U.S. Cl. ..................... 188/378; 52/167.7; 267/136; 267/141.1; 267/140.11; 267/152
[58] Field of Search ...................... 188/378, 267, 188/268; 267/136, 140.15, 140.14, 141, 152, 153, 141.1, 140.11, 35, 219, 292, 295, 293, 294, 279, 140.13; 52/167.7, 167.8, 167.1; 248/550, 562, 636, 638

[56] References Cited

U.S. PATENT DOCUMENTS

| | | |
|---|---|---|
| 2,535,080 | 12/1950 | Lee . |
| 3,920,231 | 11/1975 | Harrison et al. . |
| 4,779,853 | 10/1988 | Sugino et al. . |
| 4,887,788 | 12/1989 | Fischer et al. . |
| 4,895,353 | 1/1990 | Roth et al. . |
| 4,978,581 | 12/1990 | Fukahori et al. ........................ 52/167.7 |
| 4,991,366 | 2/1991 | Teramura et al. . |
| 5,030,490 | 7/1991 | Bronowicki et al. . |
| 5,161,338 | 11/1992 | Tada . |
| 5,201,155 | 4/1993 | Shimoda et al. ........................ 52/167.7 |
| 5,233,800 | 8/1993 | Sasaki et al. . |
| 5,295,337 | 3/1994 | Massarsch . |
| 5,324,117 | 6/1994 | Matsushita et al. . |

(List continued on next page.)

FOREIGN PATENT DOCUMENTS

| | | |
|---|---|---|
| 5-10389 | 1/1993 | Japan . |
| 1746092 | 7/1992 | U.S.S.R. . |

OTHER PUBLICATIONS

Sheiba et al, "Application of approximate separation of variables to cylinder vibration problems," Sov. Phys. Acoust., vol. 23, No. 1, Jan–Feb. 1977.
*Technological Development of Earthquake-resistant Structures*, 1987, pp. 1, 30–31, 228, 414.

*Primary Examiner*—Douglas C. Butler
*Attorney, Agent, or Firm*—Wigman, Cohen, Leitner & Myers, P.C.

[57] ABSTRACT

An earthquake resistant foundation based on the method of longitudinal wave filtration by periodic or quasi-periodic septate waveguides. The generic septate waveguide comprises either a series of cylindrical or annular polymer members or a stratified medium with air-filled cylindrical channels. In all cases, the polymer members are reinforced along their torsional surfaces. As the waveguides are distributed into a specific matrix, they serve as an isolating and damping device which is placed between the source of sound, shock or vibration waves and the object of protection. The elements of the waveguide are the individual septate cylindrical cross sections, which comprise a configuration of polymer, viscous or non-viscous liquid and air constituents bonded to and separated by the rigid end plates. The method postulates that radial displacement be zero at the boundary between the polymer member and the septum. Furthermore, the polymer member should be incompressible, and the septa are rigid. The admittance matrix Y of the element is constructed within the framework of the hypothesis for planar cross sections. The elastic parameters of the polymer element and the specific geometry relating the cylinder's radius to its height are defined theoretically on the basis of the wave filtration condition for the transfer matrix of periodic waveguides. Each element is tuned on an appropriate resonance frequency within the broadband of filtration. The synergy of combining waveguide elements results in a system which is a high-efficiency broadband filter. This system of waveguides with periodic or quasi-periodic structures exhibits shock isolation and damping properties which are superior to other systems, even for the case when the latter is constructed with high-loss materials.

20 Claims, 15 Drawing Sheets

U.S. PATENT DOCUMENTS

| | | |
|---|---|---|
| 5,339,580 | 8/1994 | Koshika et al. . |
| 5,353,559 | 10/1994 | Murota et al. . |
| 5,373,670 | 12/1994 | Sasaki et al. ............ 52/167.7 |
| 5,452,548 | 9/1995 | Kwon .................... 52/167.8 |
| 5,458,222 | 10/1995 | Pla et al. . |
| 5,474,840 | 12/1995 | Landin . |
| 5,489,180 | 2/1996 | Ichihara et al. ............ 52/167.7 |
| 5,490,356 | 2/1996 | Kemeny . |
| 5,491,938 | 2/1996 | Niwa et al. . |
| 5,502,932 | 4/1996 | Lu . |

$u_r|_{r=r_1}=0 \quad \sigma_{rr}|_{r=r_0}=0$ $\sigma_{rz}|_{r=r_1}=0 \quad \sigma_{rz}|_{r=r_0}=0$ $\sigma_{zz}|_{z=0}=-P \quad u_r|_{z=0,h}=0$ WHERE $\epsilon = \dfrac{r_0}{r_1}$ $(u_r)_{r=R}=0 \quad (\sigma_{rr})_{r=r_0}=0$ $(\sigma_{rz})_{r=R}=0 \quad (\sigma_{rz})_{r=r_0}=0$ $(\sigma_{zz})_{z=0}=-P/(1-\epsilon^2\kappa^2) \quad$ WHERE $\epsilon=r_0/r_1$ $(u_r)_{z=0,h}=0 \quad \kappa=r_1/R$

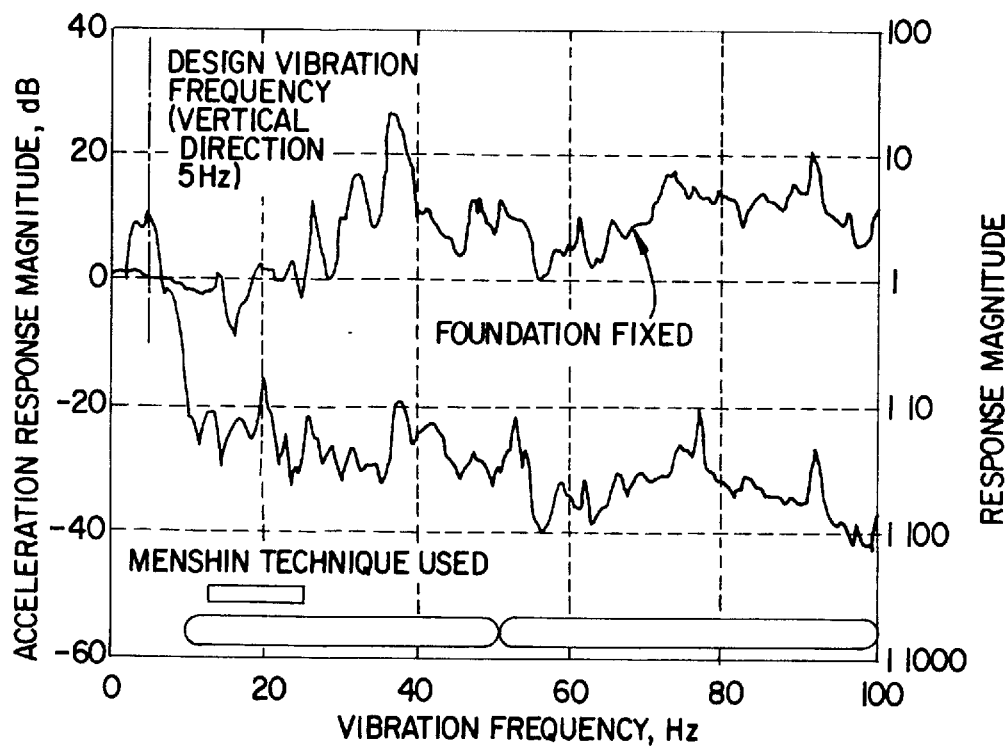
FIG. 22 RESULTS OF MENSHIN TESTS
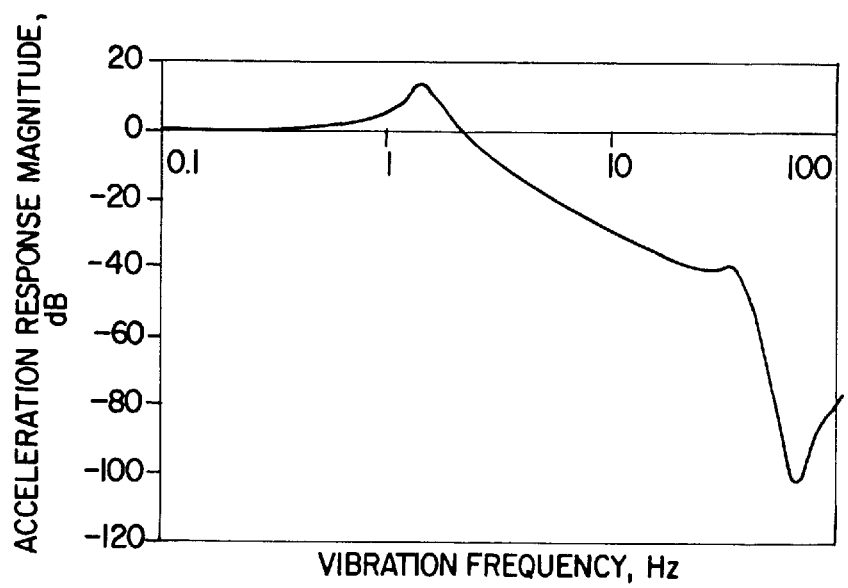
FIG. 23 EARTHQUAKE-RESISTANT FOUNDATION EFFICIENCY

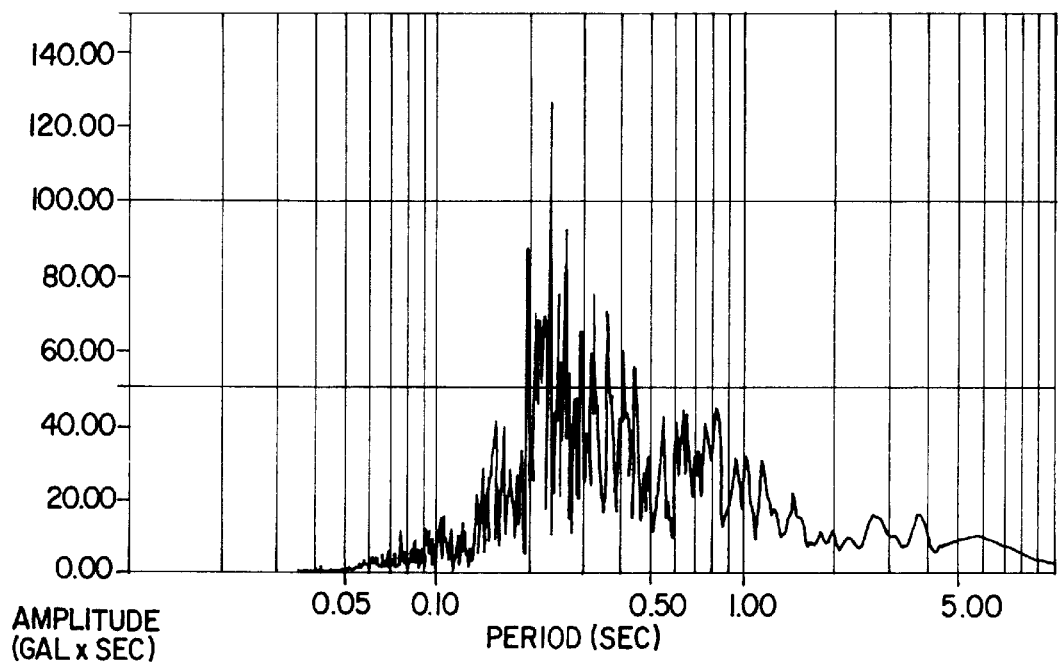
FIG. 24
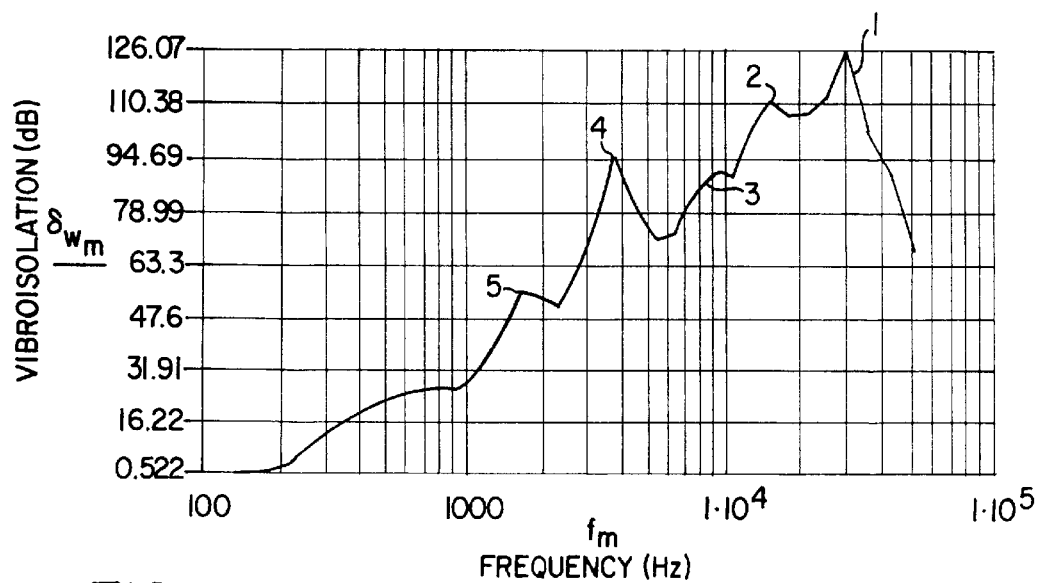
FIG. 25 MODEL EFFICIENCY

METHOD AND APPARATUS FOR BROADBAND EARTHQUAKE RESISTANT FOUNDATION WITH VARIABLE STIFFNESS

This application is a continuation-in-part of Ser. No. 8/551,655, filed Nov. 1, 1995 (now abandoned), Ser. No. 08/609,232, filed Mar. 1, 1996 (now abandoned), PCT/US96/17546, filed Nov. 1, 1996 (now withdrawn) and Ser. No. 08/809,546, filed Mar. 21, 1997.

FIELD OF THE INVENTION

The present invention is directed to a method and apparatus for absorbing shock waves and isolating seismic vibrations employing a system interposed between a source of shock excitation and an object to be protected. More particularly, it relates to an improved method and apparatus for shock absorption and vibration isolation for earthquake protection of buildings using one or more cylindrical or annular polymer members which are reinforced along their torsional surfaces and which are tunable by adjusting the thickness of individual polymer layers.

BACKGROUND OF THE INVENTION

A variety of vibration protection damping systems have been proposed to be disposed between a vibratory body or a source of signal excitation and a body to be protected such as a building, in order to effectively damp the shock and vibrations from the source. One such system is a rubber spring device, such as the one disclosed by Harrison et al. in U.S. Pat. No. 3,920,231. This device comprises an annular rubber member bonded between metal end plates and containing an inelastic fluid which modifies the spring characteristics. A method of determining and damping vibrations is disclosed by Sugino et al. in U.S. Pat. No. 4,779,853. That patent discloses determining a first resonant frequency of a system comprising a vibratory body, a supporting body and a damping device disposed therebetween. Vibrations at the first resonant frequency are damped by defining first and second chambers in the device which are separated from each other through a passage configured to impart a second resonant frequency to a fluid received within the passage which substantially equals the first resonant frequency.

Similarly, U.S. Pat. No. 5,030,490 to Bronowicki discloses a viscoelastic sandwich portion formed of viscoelastic material and a first elastic material and the sandwich portion being bounded by two segmented layers of a stiff second elastic material one on each side of the softer sandwich portion. High damping is realized by choosing a second material that is considerably stiffer than the first elastic material in all directions of loading.

One typical shock absorbing system is disclosed in U.S. Pat. No. 4,887,788 to Fisher, the disclosure of which is hereby incorporated by reference. That patent illustrates a base isolating pad consisting of a primary energy absorbing element secured on both sides by mounting plates. In order to absorb enough vibrational energy, an inner central core, made of a viscous material is required. Also, U.S. Pat. No. 2,535,080 to Lee is directed to mounting means for preventing the transmission of vibrations, shocks and noises from the load to the base. The damping characteristics of the mounting means may be made to follow optimum values by changing the hydraulic action during deflection by varying the sizes of the orifices through which the hydraulic medium must flow.

In Japan, the research and development of earthquake-resistant structures is a national priority, and the technology has even created a special word which describes its objective—Menshin. There is no equivalent of this word in the English language. In a broad sense, it stands for a technique used in the construction of earthquake-resistant structures (buildings, bridges, etc.) for reducing the amplitude of seismic vibrations acting on the structure. This is achieved by: 1) digging trenches around the foundation; 2) using laminated rubber bearings; 3) constructing a flexible first story, etc. The Menshin approach mainly aims at extending the period of oscillation of a building and thus controls its response. In other words, it is a technique to absorb seismic waves. (See *Technological Development of Earthquake-resistant Structures*, Dr. V. S. Kothekar, Ed., A.A. Balkema Publishers, Rotterdam/Brookfield, Vt., 1993.) Several U.S. patents have been issued directed to seismic isolation devices. Among these is U.S. Pat. No. 5,490,356 to Kemeny which is directed to a seismic isolation bearing which is made up of a plurality of layers of viscoelastic material separated by metal plates and having a central cavity. The seismic bearing includes external or internal tapered steel pin uniform yielders. U.S. Pat. No. 5,233,800 to Sasaki et al is directed to a variety of earthquake-proofing structures which use a viscoelastic or viscous body externally surrounded by laminated restraining members. U.S. Pat. No. 5,339,580 to Koshika et al is directed to a variety of embodiments of laminated rubber building support and vibration damping devices which include supports having central cavities. U.S. Pat. No. 5,324,117 to Matsushita et al is directed to a laminated rubber bearing having a central cavity into which a columnar- or conical-shaped viscoelastic body is forcibly inserted. Additional damping devices and structures are disclosed in U.S. Pat. No. 5,161,338 to Tada, U.S. Pat. No. 5,491,938 to Niwa et al, U.S. Pat. No. 5,353,559 to Murota et al, U.S. Pat. No. 4,895,353 to Roth et al, U.S. Pat. No. 4,991,366 to Teramura et al, U.S. Pat. No. 5,474,840 to Landin, U.S. Pat. No. 5,502,932 to Lu and U.S. Pat. No. 5,295,337 to Massarsch.

However, none of these prior art methods or vibration isolating or shock absorbing systems allow one to realize efficiency and vibration isolation by varying the material parameters and geometry of the structure. Furthermore, the prior art does not employ broadband longitudinal wave filtration on the basis of waveguides with periodic or quasi-periodic structures.

SUMMARY OF THE INVENTION

The present invention is directed to overcoming the deficiencies in the prior art by providing a method and corresponding structures for elastic wave filtration comprising the absorption of longitudinal waves by periodic or quasi-periodic septate waveguides. The method and corresponding apparatus allows one to realize significant efficiency and vibration isolation by varying the material parameters and geometry of the structure. The dimensionless wave number $g(\omega)$ of the longitudinal waves propagating through the waveguide becomes imaginary, and subsequently the transmissivity of the waves in the device approaches zero. This is the condition for inhomogeneous or non-propagating waves. Thus, for waveguides with a periodic or quasi-periodic structure, the isolation and damping are significantly greater than for the cited devices and methods, even for the case when the latter comprises a high-loss material.

The vibration damping system of the present invention, e.g., sound, shock and vibration isolating and damping device (waveguide), is interposed between a vibratory body and a supporting body. First through fifth embodiments of a general nature are shown and disclosed. In one embodiment the waveguide comprises individual septate cylindrical cross sections, which include polymer, viscous liquid and air constituents bonded to and separated by rigid end plates.

The waveguide includes stacked cylinders which are reinforced along their torsional surfaces, each individually tuned to different resonance frequencies. The structure of these waveguides can be of the solid-elastic or liquid-elastic type. The former comprises a stratified series of polymer cylindrical layers bonded by rigid septa. The latter comprises a series of annular polymer layers bonded by rigid septa, and the cylindrical channels of which are filled with a viscous liquid. The solid material of the cylinders is a polymer whose Poisson's ratio approximates 0.5. At least one surface is free to vibrate in the direction transverse to the direction of the vibration. A surface which is free to vibrate is referred to as a free surface.

By integrating the effects of each component, broadband waveguide filtration is achieved. The waveguide structure and geometry is specially designed to create the non-transmissibility condition of longitudinal waves, which is demonstrated by high shock efficiency and dramatic vibration isolation and damping.

The same conditions apply to a stratified medium, whose main element is an elastic layer made from a specific rubber-like material with cylindrical holes reinforced along its torsional surfaces. The holes provide for the transformation of longitudinal wave energy into transverse shear waves, which are characterized by a significant loss factor.

Additional embodiments are directed to a broad band mount for isolating a vibrating component or structure from its surroundings, with variable stiffness and viscosity which is made up of the sound (noise), shock and vibration isolating and damping device (waveguide) interposed between a source of signal excitation and protected body or medium. The waveguide is a device of stacked cylinders, which are reinforced along their torsional surfaces. The mount design can take several distinct forms. The sixth embodiment is a stack of solid cylindrical elements reinforced along their torsional surfaces. The seventh embodiment, which is theoretically equivalent to the sixth embodiment, is a solid polymer cylinder reinforced along its perimeter at several heights by rings. The eighth embodiment is a series of annular polymer elements, which are reinforced by intermediate plates and whose cavities are filled with a non-controllable liquid. Specific embodiments of mounts or foundation elements to be interposed between a building and the earth are disclosed for seismic protection. Foundation elements are interposed between the building foundation and the earth. Alternatively, foundation elements can be arranged in a concave hemispherical pattern buried beneath the building or structure to be protected. A non-controllable fluid may be viscous or non-viscous, but, as a condition its viscosity remains constant. The ninth embodiment, which is theoretically equivalent to the eighth embodiment, comprises a hollow polymer cylinder whose perimeter is reinforced at several heights by rings and whose cavity is filled with a non-controllable liquid. Specific embodiments of mounts or foundation elements to be interposed between a building and the earth are disclosed for seismic protection. Foundation elements are interposed between the building foundation and the earth. Alternatively, foundation elements can be arranged in a concave hemispherical pattern buried beneath the building or structure to be protected. The embodiments described above are broad band mounts with variable stiffness. The solid material in both cases is a polymer whose Poisson's ratio approximates 0.5. The waveguide components are reinforced cylinders tuned to different resonance frequencies. The result of integrating the effects of each component is broadband waveguide filtration. The developed waveguide structure and geometry create the non-transmissibility condition of longitudinal waves, which is demonstrated by high shock efficiency and dramatic vibration isolating and damping.

BRIEF DESCRIPTION OF THE DRAWINGS

FIG. 22 illustrates the results of Menshin Tests. Two cases are considered: one where the foundation is fixed and the other where the Menshin technique is used.

FIG. 23 demonstrates the efficiency of a earthquake-resistant foundation with variable stiffness.

FIG. 24 illustrates the Fourier Spectrum of an earthquake.

FIG. 25 is a graph showing a model efficiency when all five polymers are utilized in the model, with the vibration isolation characteristics of each material shown by respective resonant peaks.

THEORY OF OPERATION

Before discussing the invention in detail, the theoretical underpinnings of the invention are discussed. The Method and Apparatus of Elastic Wave Filtration, Ser. No. 08/551,655, filed Nov. 1, 1995, serves as the theoretical basis for this invention. A review of the fundamental principles and the application of mathematical formulae to a known structure is provided below.

Figure 3:
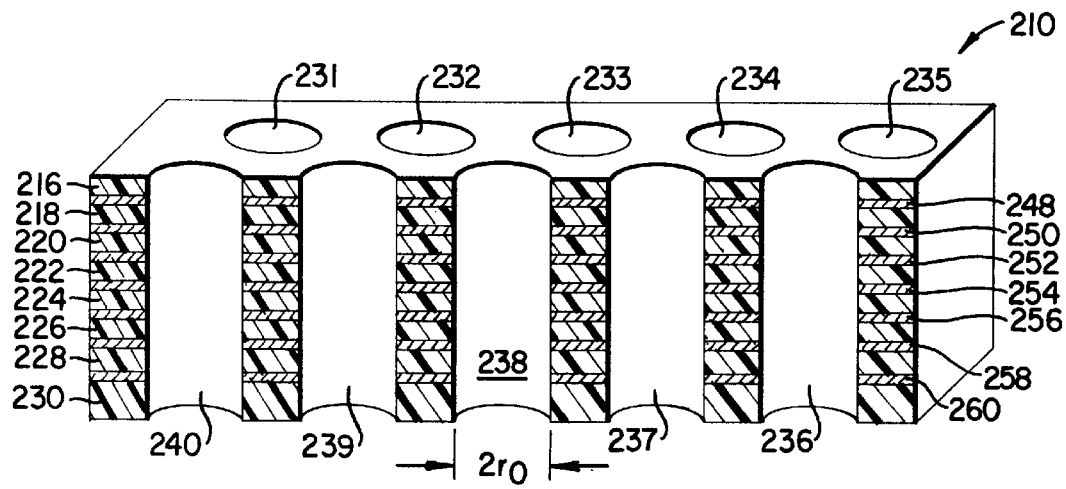
FIG. 3 is a schematic view of a third embodiment of the vibration absorbing system in accordance with the present invention, showing a stratified reinforced medium with cylindrical channels therein.

Referring to FIG. 3 which depicts a lattice of cylindrical channels within a stratified reinforced medium, the problem of elastic wave propagation in a stratified, liquid-elastic medium is reduced to a consideration of the behavior of a symmetrical cylindrical wave guide with a periodic or quasi-periodical structure, acted upon by an incident longitudinal wave. An incident (compressional) longitudinal wave propagates along the wave guide axis because of free, lateral surface compliance, which is two orders of magnitude more than that of the water or rubber compressibility. This propagation would occur even for an incompressible material. The reinforcing rigid insert in the hole divides the cylinder's lateral surface by its ribs, creating a stratified wave guide. Every layer (wave guide element) transforms the longitudinal wave into a flexural wave by the deformation in the direction of the free lateral surface. Dynamically, the deformation amplitude maximum will occur at the resonance frequency of each layer, which is determined by the layer's Lamé constants and its geometry.

Figure 2:
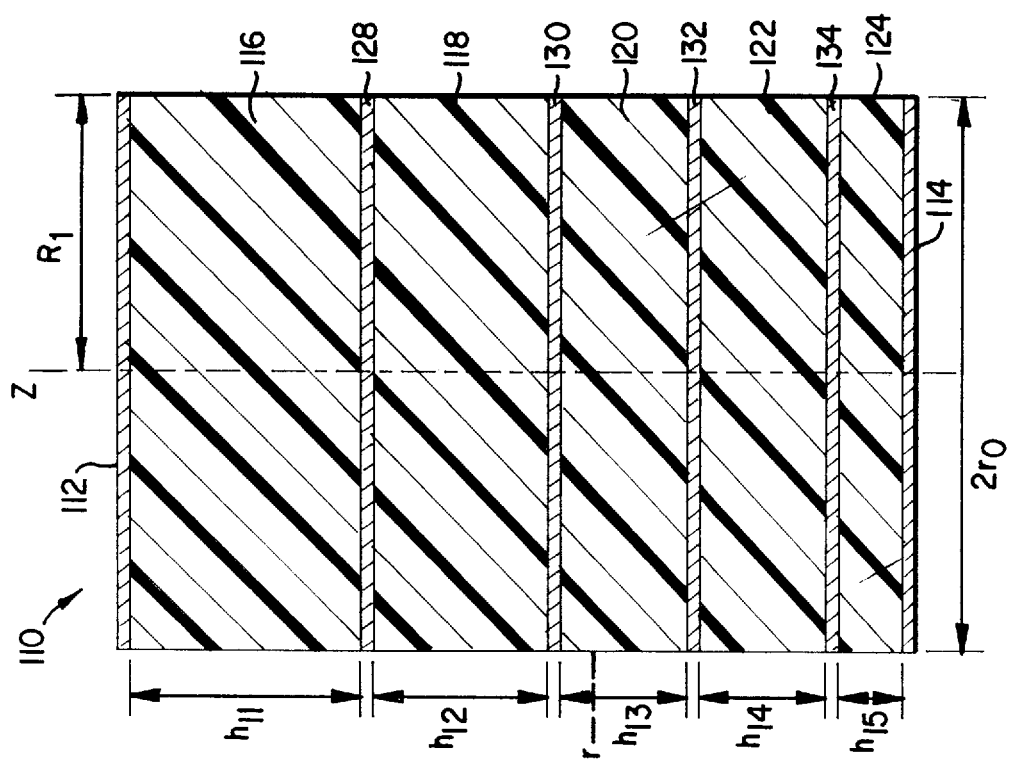
FIG. 2 is a schematic illustration of a second embodiment of the vibration absorbing system in accordance with the present invention, showing a solid-elastic type waveguide comprising a stratified series of polymer cylindrical layers bonded by rigid septa.
Figure 1:
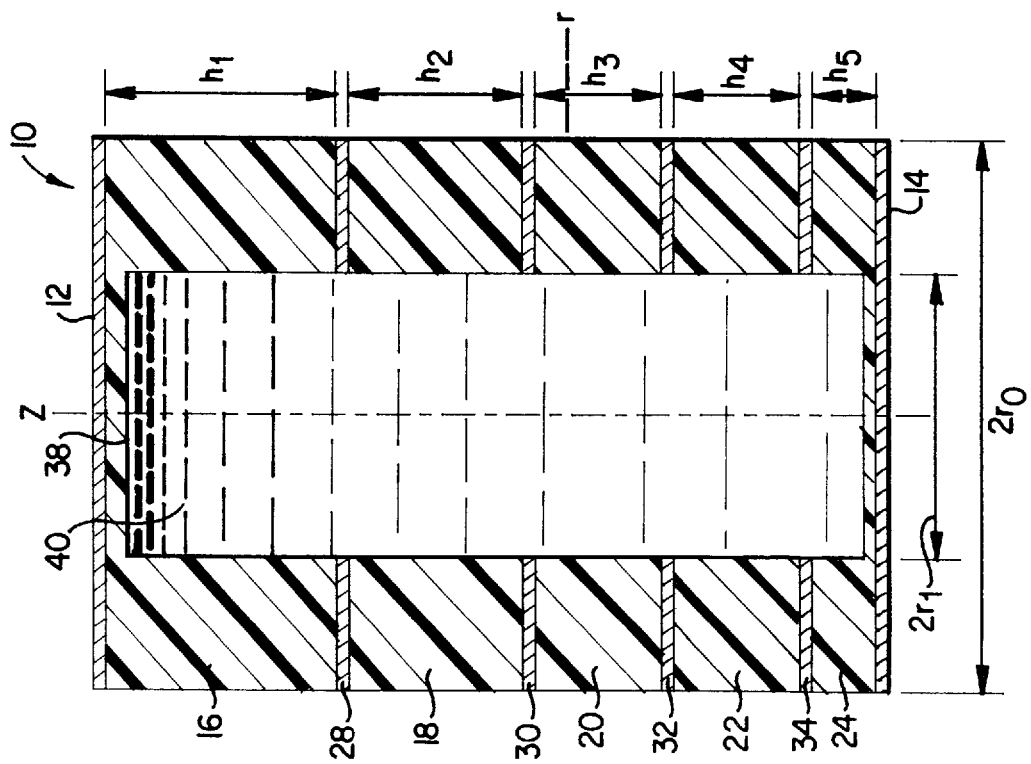
FIG. 1 is a schematic illustration of a first embodiment of the stratified liquid-elastic waveguide which has a quasi-periodic structure with a stack of reinforced annular polymer members of variable thickness.
Figure 4:
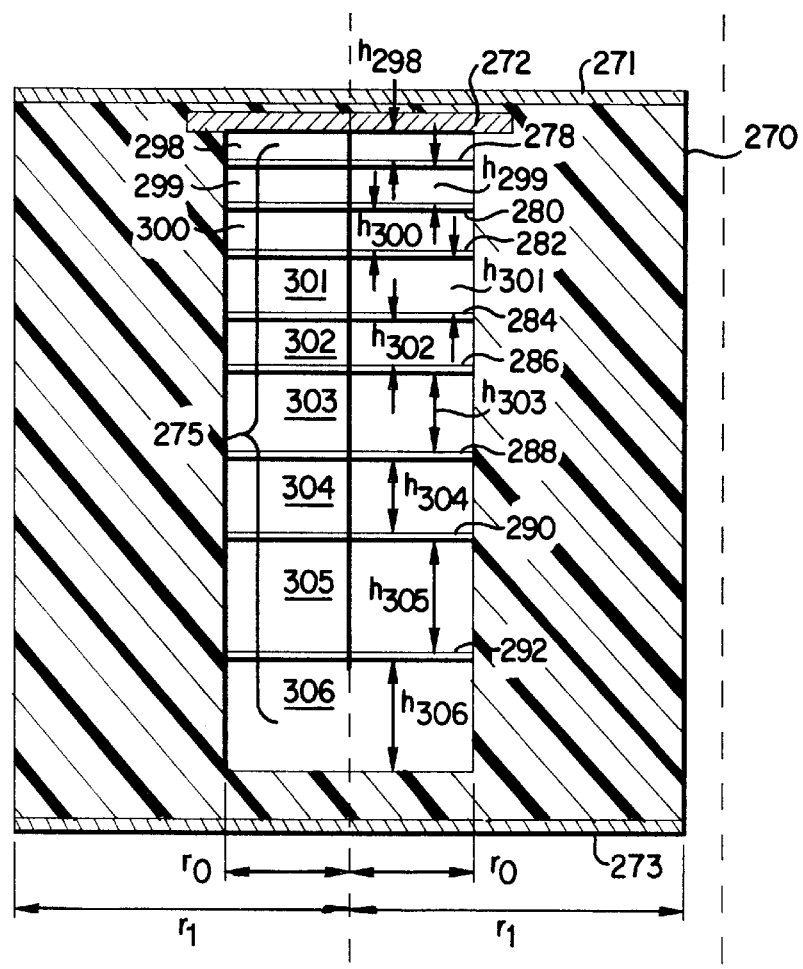
FIG. 4 is a schematic view of a fourth embodiment of the vibration absorbing system in accordance with the present invention, showing a single element of a solid-elastic type waveguide material having a cavity therein for receiving a plurality of spaced apart rigid plates which interact with the waveguide material to produce regions of waveguide material having free surfaces.
Figure 5A:
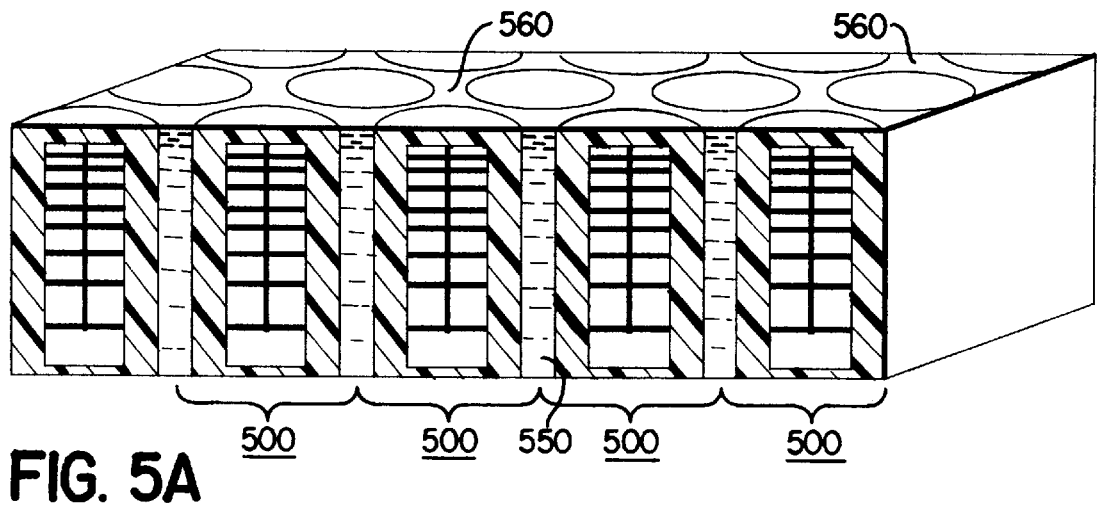
FIG. 5A is a schematic view of a fifth embodiment of the vibration absorbing system in accordance with the present invention.
Figure 5B:
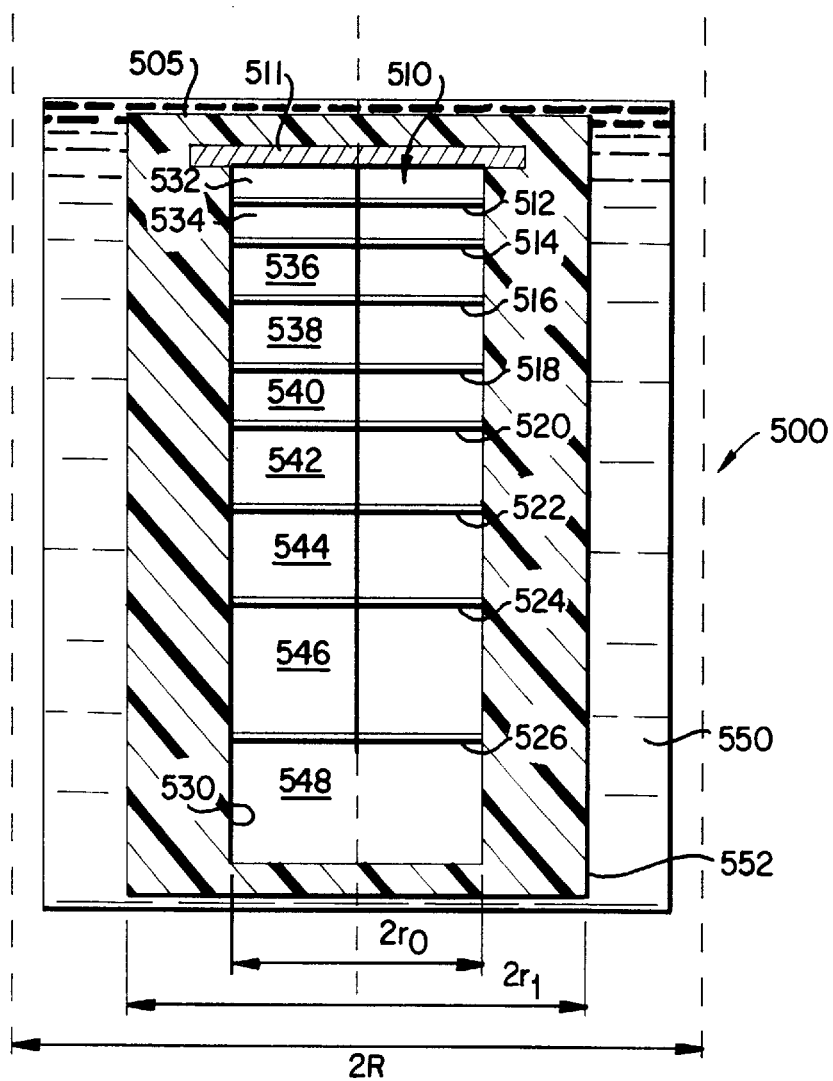
FIG. 5B is a schematic view of a single cylindrical structure of the fifth embodiment of FIG. 5A.
Figure 10:
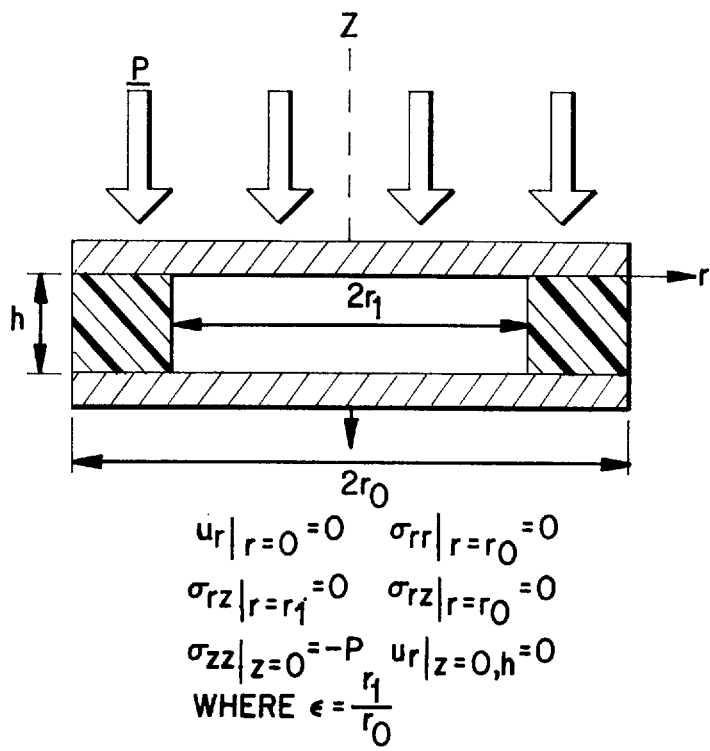
FIG. 10 is a mechanical model of the boundary conditions of a first and a second embodiment of the present invention as shown in FIG. 1 and FIG. 2.
Figure 11A:
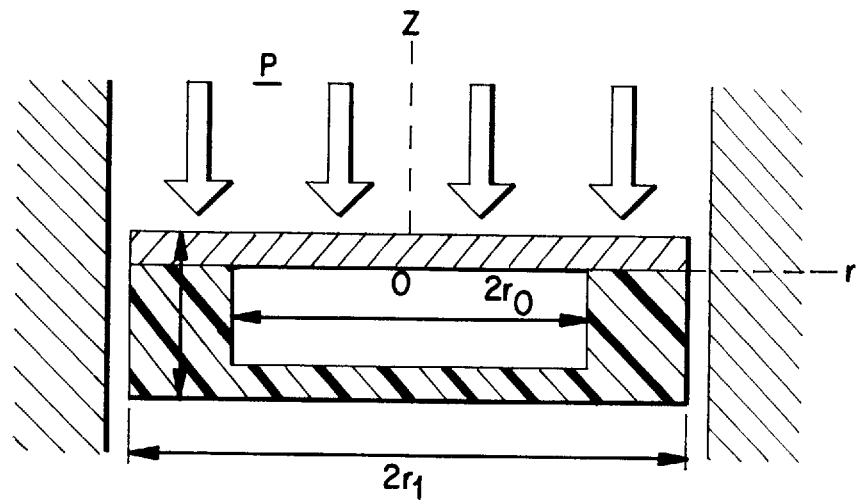
FIG. 11A is a mechanical model of the boundary conditions of third and fourth embodiments of the present invention as shown in FIGS. 3 and 4.
Figure 11B:
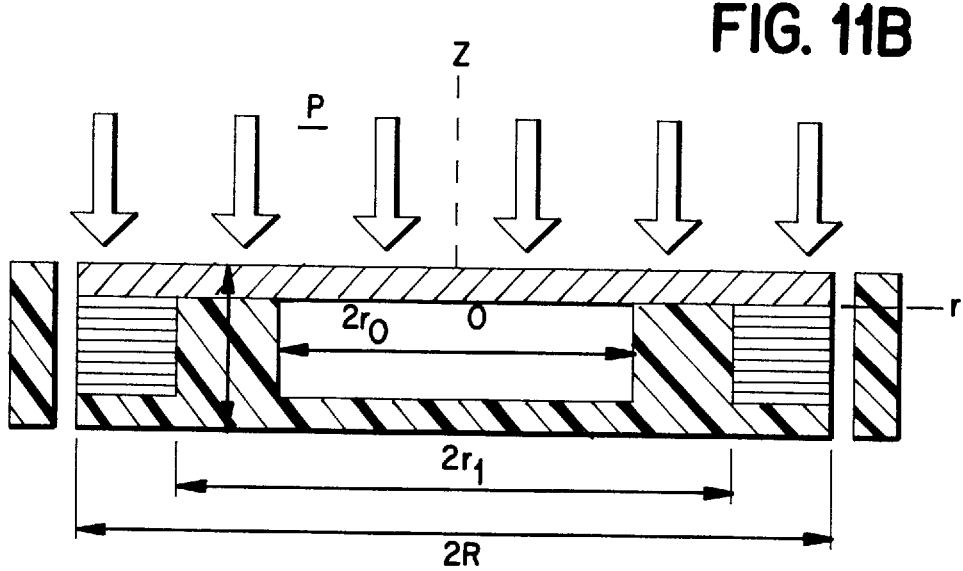
FIG. 11B is a mechanical model of the boundary conditions of a fifth embodiment of the present invention as shown in FIGS. 5A and 5B.

Referring to FIG. 10, it is evident that these boundary conditions, particularly for the embodiments of FIGS. 1 and 2, are similar but not identical to those boundary conditions in FIG. 11A, which describes the embodiments of FIGS. 3 and 4 and FIG. 11B which describes the embodiments of FIGS. 5A and 5B. The two latter cases are the mathematically inverted problem of the former's boundary conditions, wherein for a cylindrical coordinate system:

$u_r$ is a component of the displacement vector in the radial direction;

$\sigma_{rz}$ is the shear stress tangential to the torsional surfaces.

$\sigma_{rr}$ is the tensile or compressive stress perpendicular to the torsional surfaces;

$\epsilon$ is the ratio of inner to outer radii; and

P is the magnitude of the compressive or tensile stress.

The physical-mechanical properties of a polymer layer are similar to that of water or a viscous liquid. Poisson's relation, $v$, for the liquid is equal to 0.5, and for the rubber-like polymer $v \rightarrow 0.5$. Isotropic elastic materials may be described by two Lamé constants, $\lambda$ and $\mu$, $\lambda$ is the stiffness or Lamé constant corresponding to the bulk modulus; $\mu_r$ is the second Lamé constant corresponding to the shear modulus of the material. The bulk modulus of the liquid, $\lambda_l$, and the extensional-compressional modulus of elasticity of the rubber-like medium, $\lambda_l+2\mu_r$, are almost the same numerically. The rubber-like polymer, however, is a solid material whose shear modulus, $\mu_r$ is finite and two to four orders of magnitude smaller than its extensional-compressional modulus of elasticity. These characteristics make it possible to transform the direction of vibrations in rubber by means of a free lateral surface of the cylinder, as shown in FIGS. 1 and 2, or by the cylindrical channels (perforations) placed in layers of material, as shown in FIGS. 3, 4, 5A and 5B. The channels in the rubber-like material and the free lateral surface of the cylinder allow the material to be deformed in the transverse direction in response to a compressional force.

Figure 12:
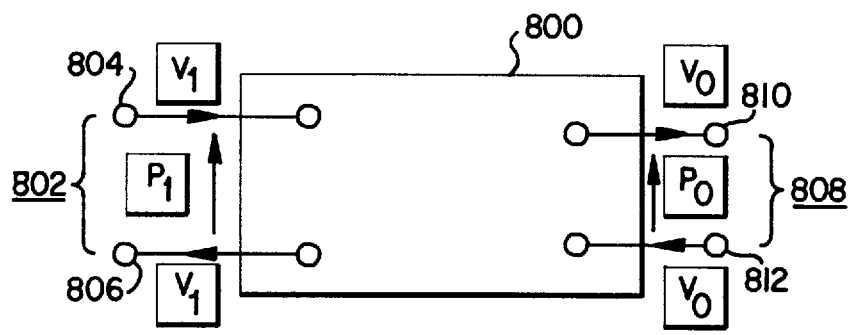
FIGS. 12 and 13 are schematic illustrations of a two-port electrical circuit and a chair of symmetrical four-pole circuits, each of which propagates and filters waves.
Figure 13:
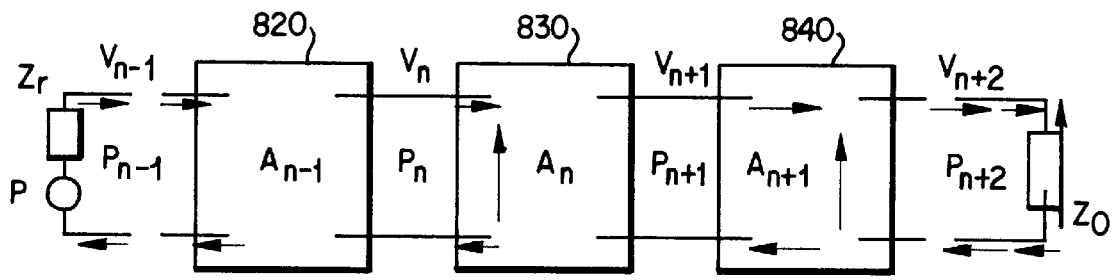

Elastic wave propagation and absorption through a waveguide comprising either a stack of reinforced cylinders or a composite elastic layer with the aforementioned boundary conditions, can be viewed as a problem of wave propagation through a two-port electrical circuit or as wave filtration within a chain of symmetrical four-pole circuits, as shown in FIGS. 12 and 13.

FIG. 12 shows an individual circuit element 800 having input port 802 with input nodes or poles 804, 806 and output port 808 with nodes or poles 810, 812. Circuit element 800 is representative of a single layer or region of polymeric waveguide material.

FIG. 13 shows a plurality of interconnected circuit elements 820, 830 and 840, and is representative of a structure having three layers or regions of polymeric waveguide material. Each element 820, 830, and 840 operates as shown for element 800 in FIG. 12.

The analogous electrical circuit under consideration is illustrated in FIG. 13 in the form of elements 820, 830, 840 interconnected with input and output lines. Two poles are located on both sides of each element (i.e. four-pole system) and the interconnection symbolizes a network. For each pole, the current (velocity $V_i$) and the electric potential (pressure $P_i$) are registered at the input and the output of each element. The pressure is defined as the dynamic force per unit of surface area. The values of the current (velocity) and the electric potential (pressure) for each pair of poles determines the physical connection between two adjacent elements. As shown in FIG. 13, a pressure P is imposed and is modeled in conjunction with an internal impedance $Z_1$. The transmittal pressure $P_{n+z}$ is modeled in conjunction with a backing impedance $Z_O$.

The relationship between the pressure and velocity at the input and output of the layer may be written in simple matrix form in equation (1) below:

$$\begin{vmatrix} P_I \\ V_I \end{vmatrix} = \begin{vmatrix} A & B \\ C & D \end{vmatrix} \cdot \begin{vmatrix} P_0 \\ P_0 \end{vmatrix} \tag{1}$$

The indices I and O represent an input and output, respectively. The coefficients A, B, C, D, in general, are transfer matrix complex parameters, dependent on the passivity relation (i.e., no other sources are inside of the four-pole circuit):

$$A \cdot B - B \cdot C = 1 \tag{2}$$

A and D are dimensionless, B has an impedance dimension, C has an admittance dimension. From (1) the input impedance of the composite layer may be easily obtained through the transfer matrix parameters, $$Z_I = \frac{A \cdot Z_O + B}{D + C \cdot Z_O} \tag{3}$$

The infinite chain of the identical four-pole circuits is illustrated on FIG. 13.

Propagation of a longitudinal monochromatic wave along this line is described by a complex factor $\xi$, which is multiplied by $P_n$ and $V_n$ when the wave is moving from block n to block n+1. Then, $$P_{n+1} = \xi \cdot P_n$$

$$V_{n+1} = \xi \cdot V_n \tag{4}$$

Combining (4) with (1) a homogeneous linear system is obtained relative to $P_n$ and $V_n$:

$$P_n \cdot \xi = A \cdot P_n + B \cdot V_n$$

$$V_n \cdot \xi = C \cdot P_n + D \cdot V_n \tag{5}$$

The eigenvalues of this matrix are calculated as follows:

$$\begin{vmatrix} A - \xi & B \\ C & D - \xi \end{vmatrix} = \xi^2 - (A - D) \cdot \xi + 1 = 0 \tag{6}$$

because according to (2), the determinant of the transfer matrix is unity, i.e. [A]=1. The values of $\xi$, expressed as a function of the four-pole circuit, are equal to the eigenvalues. Roots of (6) are:

$$\xi_1, \xi_2 = \frac{1}{2} \cdot (A + D) \pm \sqrt{\frac{(A + D)^2}{4} - 1} \tag{7}$$

or in terms of wave propagation $$\xi = e^{\pm \gamma(\omega) \cdot h} = e^{\pm i \cdot (k(\omega) + i\alpha) \cdot h} = e^{\pm i \cdot g(\omega) \cdot h} \tag{8}$$

where Y is a propagation constant, $\alpha$ is a damping constant and k is the wave number for an infinite line. A dimensionless wave number $v(\theta) \cdot h$ is obtained over the length of the waveguide section. It allows one to define the damping contribution of each section into the vibration absorber structure. From the trigonometric identity $$\frac{(\xi_1 + \xi_2)}{2} = \cosh(\gamma) = \frac{(A + D)}{2},$$

one can see that the dimensionless wave number is of the form:

$$g(\omega) \cdot h = \pm i \cdot \gamma \cdot h = \pm i \cdot \ln(\xi) = \pm \arccos\left(\frac{A + D}{2}\right) \tag{9}$$

From equation (9), it follows that when $|A+D|>2$, the trigonometric function becomes imaginary. This is the condition of intransmissibility of the longitudinal waves through the waveguide with a periodic or quasi-periodic structure.

The sectional damping, $\delta(\omega)$, over the length of a waveguide section is defined as:

$$\delta(\omega) = -8.7 \cdot Im[g(\omega) \cdot h] \tag{10}$$

The singularities of this equation show up at the resonance frequencies of the sections, most conspicuously in waveguides with sections having a length on the same order as the radius. In this case, the radial displacements are commensurate with the longitudinal displacements.

The results of a numerical analysis of the wave number (complex phase $g(\omega)$) over one length of a waveguide section, for the case $\lambda/\mu=10^4$, show that for relatively elongated cylindrical sections $$\left( y = \frac{r_0}{h} = 0.5, \epsilon^2 = 0.5 \right),$$

the phase velocity depends very slightly on the frequency except in the vicinity of the lowest resonance; here, the sectional damping is moderate (modest dispersion). Upon transition to disk sections, $$\left( y = \frac{r_0}{h} = 0.5, \epsilon^2 = 0.5 \right),$$

the curves lose their monotonicity and deep suppression zones appear at frequencies above the resonance of the symmetrical mode. There is significant growth in sectional damping, which can be explained by the dispersion of longitudinal waves and generation of inhomogeneous waves.

From the above figures one can see that the sectional damping and efficiency of the present method is significant over a broad frequency range. A 20 dB damping is equivalent to a vibration damping by a factor of 10. Likewise, a 100 dB reduction is equivalent to a vibration damping by a factor of 100,000. The device above is a three layer quasi-periodic septate waveguide, and the standard for comparison is a four layered structure of equal heights having a radius to height ratio of greater than 1.25.

Figure 14:
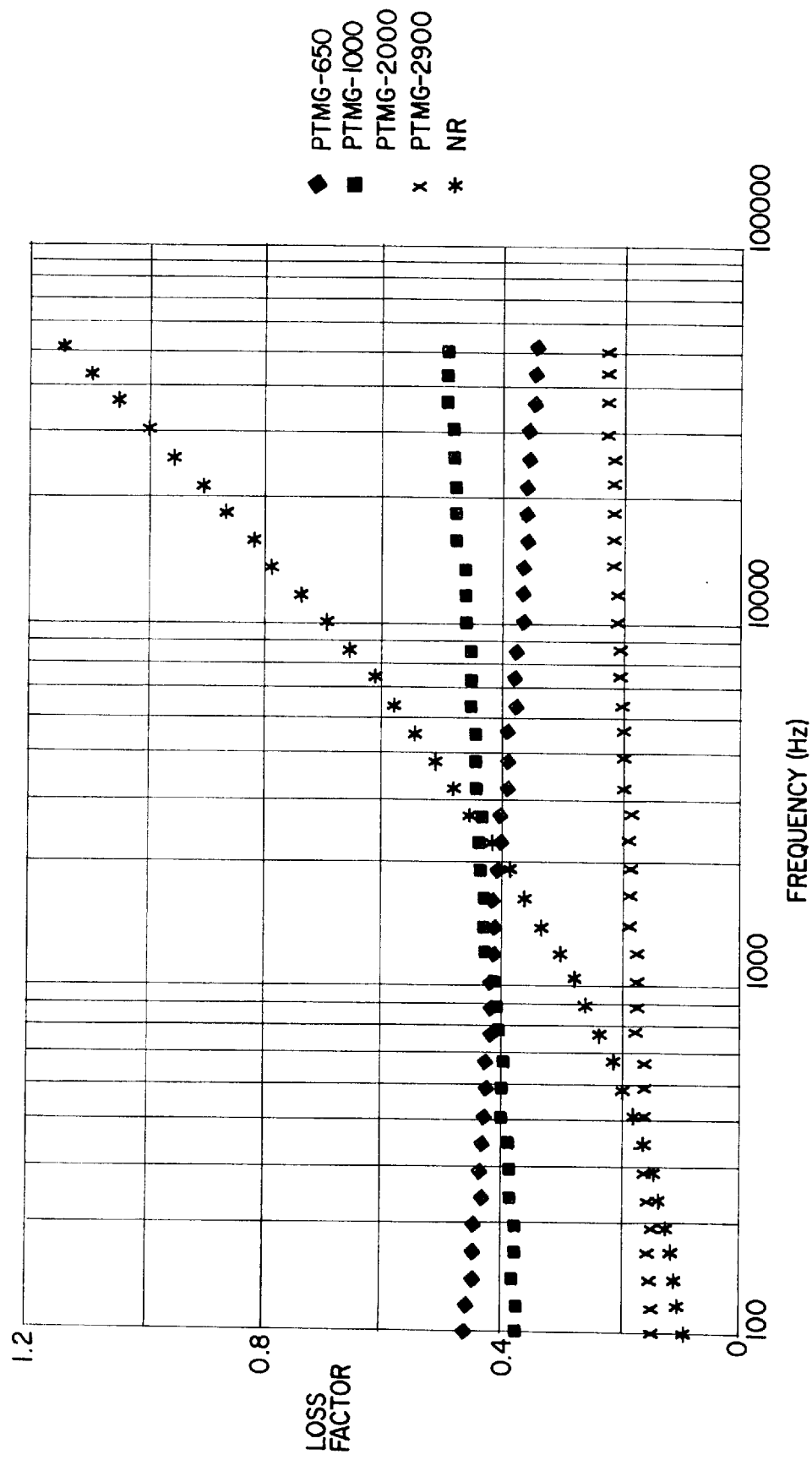
FIGS. 14 and 15 are graphs showing the characteristics of the dynamic parameters of a loss factor and shear modulus for five polymers including natural rubber.
Figure 15:
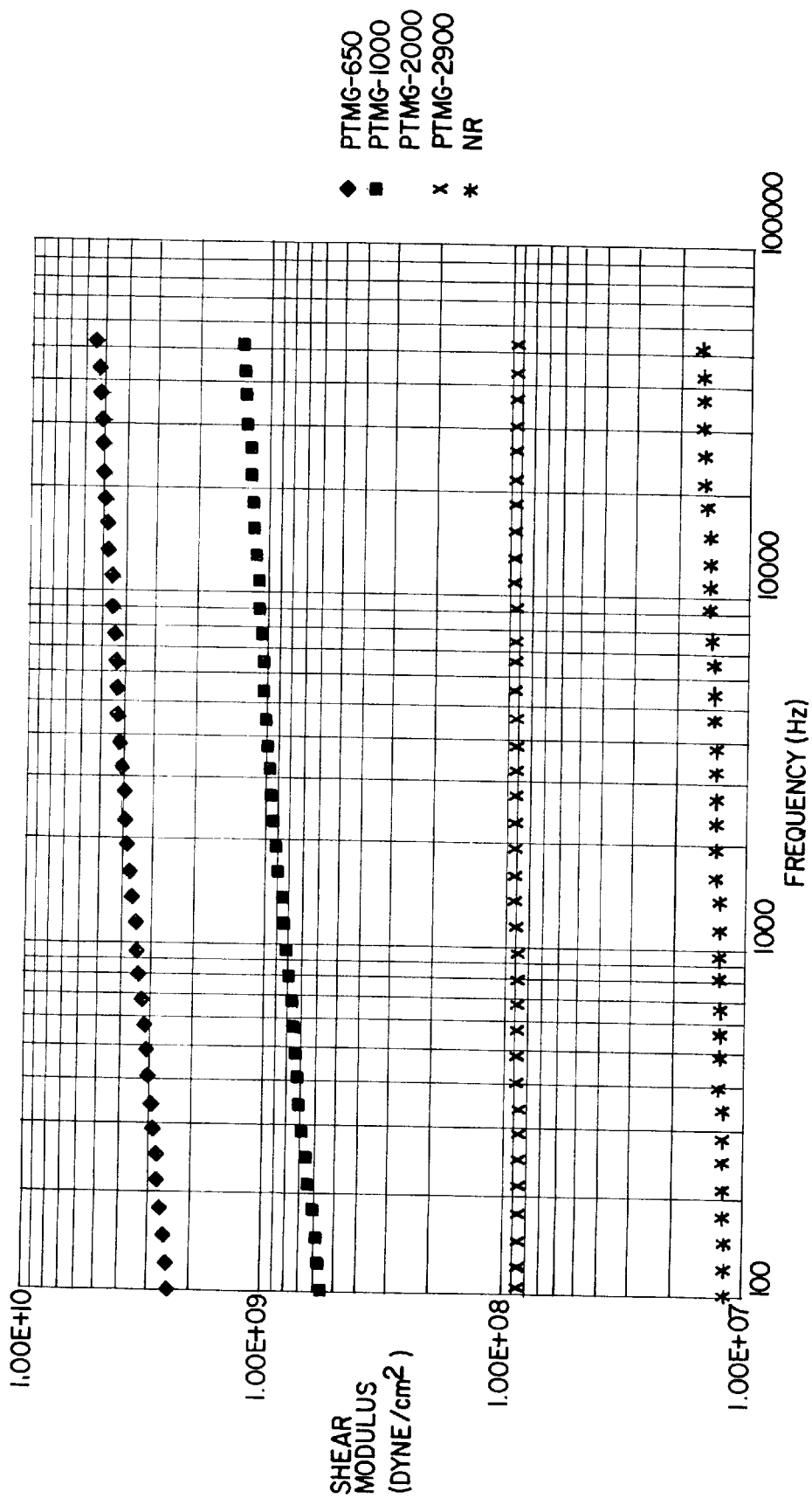

The dynamic parameters of loss factor and shear modulus for natural rubber are illustrated as functions of frequency in FIGS. 14 and 15. Knowledge of these parameters is critical to the design of the invention. Moreover, by being able to optimize these parameters as outlined in the method, one can maximize the efficiency in a designated range of filtration. This may be accomplished by selecting different materials for each resonant layer.

Now that the process of wave filtration by a stratified, vibration isolating and absorbing structure is completed, it is necessary to find proper resonance elastic layers, which are controlled by the layer geometry eigenfrequencies and which could be fitted to the required sound absorbing frequency band. Parameters of the four-pole system have to be expressed in terms of elastic parameters of the layers and their geometry.

An admittance matrix has been constructed for the cylindrical wave guide element on the basis of the boundary conditions illustrated in FIGS. 10, 11A and 11B. The variables used are as follows: $Y_n(\theta)$ the elements of the admittance matrix, and the surface velocity $v(h)=i\omega u_z(h)$, $\theta(0)-i\omega u_z(0)$ for the layer. These elements are defined as follows $$Y_j(\omega) = \frac{i}{2} \cdot \frac{k_t \cdot h}{\sqrt{\sigma \cdot \mu}} \cdot q_3 \cdot \left(\frac{h}{r_0}\right)^2 \frac{S_n}{\sqrt{\left[\frac{(k_1 \cdot h)}{2} \cdot \frac{q_3}{q_4} - \frac{q_1}{2} \cdot \left(\frac{h}{r_0}\right)^2\right]^2 + (k_1 \cdot h)^2 \cdot q_2 \cdot \left(\frac{h}{r_0}\right)^2}} + \Delta Y_j(\omega) \quad (11)$$

where j=1,2. Also, $$S_1 = \frac{\cot(\gamma_1 h)}{\gamma_1 h} - \frac{\cot(\gamma_2 h)}{\gamma_2 h}, \; S_2 = -\frac{1}{\gamma_1 h \sin(\gamma_1 h)} + \frac{1}{\gamma_2 h \sin(\gamma_2 h)} \quad (12)$$

$$\gamma_j \cdot h = \sqrt{\frac{\left[(k_j h)^2 \cdot \left(\frac{q_3}{q_4}\right) - q_1 \cdot \left(\frac{h}{r_0}\right)^2\right]}{2} \pm \sqrt{\frac{\left[(k_j h)^2 \cdot \left(\frac{q_3}{q_4}\right) - q_1 \cdot \left(\frac{h}{r_0}\right)^2\right]^2}{4} + (k_j h)^2 \cdot q_2 \cdot \left(\frac{h}{r_0}\right)^2}} \quad (13)$$

$$\Delta Y_1(\omega) = -\frac{i}{\sqrt{\rho \cdot \lambda}} \cdot \cot\left[\sqrt{\frac{\rho}{\lambda}} \cdot \omega \cdot h\right] + \frac{i}{\omega \cdot \rho \cdot h} \quad (14)$$

$$\Delta Y_2(\omega) = \frac{i}{\sqrt{\rho \cdot \lambda}} \cdot \frac{1}{\sin\left[\sqrt{\frac{\rho}{\lambda}} \cdot \omega \cdot h\right]} - \frac{i}{\omega \cdot \rho \cdot h}$$

and where $\rho$ is the density of the polymer element, and $q_1$, $q_2$, $q_3$, $q_4$, which are given below, are dimensionless constants incorporating the geometry of the waveguide element.

$$q_1 = \frac{24}{1+\epsilon^2}, \; q_2 = \frac{8}{1-\epsilon^4}, \; q_3 = \frac{8}{1-\epsilon^4}, \; q_4 = 8 \quad (15)$$

For the embodiments of FIGS. 5A and 5B, governed by the boundary conditions shown in FIG. 11B, the eigenfrequencies of the normal modes of the medium are easily controlled by a variation of the following parameters: step reinforcement $$\frac{r_0}{h},$$

where $r_0$ is the inner radius of the cylinder hole, h is the layer thickness; the h perforation factor $\epsilon$ is $$\frac{r_0}{r_1}$$

where $r_1$ is the outer radius of the solid part of the coating layer; and the filing factor is $$\kappa^2 = \frac{r_1^2}{R^2}$$

where R is the radius of interaction. The resulting dimensionless constants $q_n = f(\epsilon, \kappa)$ are given by:

$$q_1 = \frac{a}{b} = \frac{8(1-\epsilon^2) \cdot (1+3\epsilon^2\kappa^4)}{4(\epsilon\kappa)^2 \cdot \left[1 - \frac{(\epsilon\kappa)^2}{4}\right] - 4 \cdot \ln(\epsilon) - 4\kappa^2 + \kappa^4} \quad (16)$$

-continued $$q_2 = \frac{c}{b} = \frac{8(\epsilon\kappa)^2 \cdot (1-(\epsilon\kappa)^2)}{4(\epsilon\kappa)^2 \cdot \left[1 - \frac{(\epsilon\kappa)^2}{4}\right] - 4 \cdot \ln(\epsilon) - 4\kappa^2 + \kappa^4}$$

$$q_3 = \frac{1}{b} = \frac{8(\epsilon\kappa)^2}{4(\epsilon\kappa)^2 \cdot \left[1 - \frac{(\epsilon\kappa)^2}{4}\right] - 4 \cdot \ln(\epsilon) - 4\kappa^2 + \kappa^4}$$

$$q_4 = \frac{1}{d} = \frac{8(\epsilon\kappa)^2}{4(\epsilon\kappa)^2 \cdot \left[1 - \frac{(\epsilon\kappa)^2}{4}\right] - 4 \cdot \ln(\epsilon\kappa) - 3}$$

As will be readily recognized, when $\kappa=1$, the values of $q_1$, $q_2$, $q_3$ and $q_4$ of equation (16) reduce to the values for $q_1$, $q_2$, $q_3$ and $q_4$ of equation (15).

The expression for the eigenfrequencies of the waveguide element is provided below in equation (17), where m is a modal factor.

$$\omega = \frac{m \cdot \pi}{h} \cdot \sqrt{\frac{\mu}{\rho}} \cdot \sqrt{\frac{q_4}{q_3} \cdot \frac{m^2\pi^2 + q_1 \cdot \left(\frac{h}{r_0}\right)^2}{m^2\pi^2 + \frac{q_2 \cdot q_4}{q_3} \cdot \left(\frac{h}{r_0}\right)^2}} \quad (17)$$

where, h is the thickness of the layer, $\rho$ is the material's density, $\mu$ is the dynamic shear modulus, $r_0$ is the free surface radius, and $q_n$ is defined as above in either equation (15) or equation (16).

The significance of the waveguide element eigenfrequency in the method is demonstrated by the fact that adjusting the height of the element tunes the components of the waveguide to appropriate frequencies and provides highly effective broadband isolation and absorption.

For the case of an ellipsoid or elliptic cylinder geometry, the ratio of the major to minor axis is in the range 1.5–2. This will ensure a second important resonance and will broaden the band of filtration. Moreover, the relation $$1.25 < \frac{r_o}{h} < 4$$

must hold, where $r_o$ is a hole radius and h is a thickness of the reinforced layer. Therefore, for the elliptical and ellipsoid geometry, the ratios of minor and major axes to layer height must be within the aforementioned limits.

DETAILED DESCRIPTION OF THE INVENTION

Referring now in detail to the drawings wherein like parts are designated by like reference numerals throughout, there is illustrated in FIG. 1 a basic stratified liquid-elastic waveguide 10 which has a quasi-periodic structure comprising a pair of rigid end plates 12, 14 with a series of annular polymer members 16, 18, 20, 22 and 24 bonded between said plates 12 and 14. Each of the polymer members has a variable thickness $h_1$, $h_2$, $h_3$, $h_4$, and $h_5$ and an outer free surface radius $r_0$ and is bonded to the interleaving plates 28, 30, 32 and 34 between adjacent polymer members 16, 18, 20, 22 and 24. The interleaving plates 28, 30, 32 and 34 are circular in plan and with polymer members 16, 18, 20, 22 and 24 formed with a cylindrical cavity 38 with a radius $r_1$. The cylindrical cavity 38 is filled with a viscous liquid 40. The boundary conditions for such structure are shown on FIG. 10, wherein $u_r$ is a component of the displacement vector in the radial direction, $\delta_{RZ}$ is the sheer stress tangential to the torsional surfaces; $\delta_{ZZ}$ is the tensile or compressive stress perpendicular to the torsional surfaces; $\epsilon$ is the perforation factor defined by the ratio of inner to outer radius and P is the magnitude of the compressive or tensile stress.

FIG. 2 illustrates a modified example of the variation absorbing system 110 which is similar to that of FIG. 1 with the exception that it has solid polymer members 116, 118, 120, 122 and 124 with a variable thickness $h_{11}$, $h_{12}$, $h_{13}$, $h_{14}$, $h_{15}$, bonded between two rigid plates 112 and 114 and has an inner rigid plates 128, 130, 132 and 134, which are securely connected between adjacent polymer members. Again, as in FIG. 1, the free surface is the outer surface, having radius $r_0$.

FIG. 3 shows a third embodiment of the vibration absorbing system 210, having a plurality of quasi-periodic stratified layers 216, 218, 220, 222, 224, 226, 228 and 230 of acoustic absorption material and a plurality of cylindrical channels 231, 232, 233, 234, 235, 236, 237, 238, 239 and 240 filled with air. The plurality of cylindrical channels are arranged in rows which are staggered or offset with respect to each other. The reinforcing layers rigid 248, 250, 252, 254, 256, 258 and 260 are secured between a plurality of quasi-periodic stratified layers 216, 218, 220, 222, 224, 226, 228 and 230. Alternatively, the reinforcement may be provided by radial rigid inserts in the hole which divide the cylinder's lateral surface by its ribs, creating a stratified wave guide. The boundary conditions for this structure are shown in FIG. 11A.

FIG. 4 shows an embodiment, similar to the embodiment of FIG. 3, having a central cavity which is filled with a compressible fluid such as air. Rather than providing a stack of alternating rigid plates and polymer layers, FIG. 4 shows a cylindrical structure 270 formed of a polymeric material having a cylindrical central cavity generally designated by the numeral 275. Rigid end plates 271 and 273 are provided at the top and bottom, respectively, of cylindrical structure 270. Disposed at the top of the cavity 275 is a support plate 272 and disposed within cavity 275 are a plurality of rigid plates 278, 280, 282, 284, 286, 288, 290 and 292, which separate the cavity 275 into compartments 298, 299, 300, 301, 302, 303, 304, 305 and 306. The spacing of the plates 278, 280, 282, 284, 286, 288, 290 and 292 is defined respectively by $h_{298}$, $h_{299}$, $h_{300}$, $h_{301}$, $h_{302}$, $h_{303}$, $h_{304}$, $h_{305}$ and $h_{306}$. The cavity radius $r_0$ is the free surface radius. The outer surface of cylindrical structure 270, having radius $r_1$ is constrained and hence is not a free surface. The plates 278, 280, 282, 284, 286, 288, 290 and 292 are in firm contact with the inner surface of cavity 275. As a consequence, the polymeric material of structure 270 cannot move at the point of contact between the plates and the polymeric material. This results in the regions of the polymeric material between the points of contact and the outer wall of the cylindrical structure not being free to move and having no free surface. The only portions of the polymeric material which can move are those which have free surfaces communicating with the cavity compartments 298–306. This embodiment of FIG. 4 eliminates the rigid plates between layers of polymeric material and provided regions of waveguide material having different heights.

FIGS. 5A and 5B illustrate an embodiment of the invention which combines certain features of the embodiments of FIGS. 3 and 4. Specifically, as shown in FIG. 5B, a liquid-elastic cylindrical element 500 is provided comprising a cylinder 505 of polymeric waveguide material having a cylindrical center cavity 510 filled with air or some other compressible fluid, or having a vacuum maintained therein, with a top plate 511 and a plurality of insert plates 512, 514, 516, 518, 520, 522, 524, 526 similar to those of the embodiment of FIG. 4. The plates 512–526 are spaced apart and contact the inner wall 530 of the cylindrical cavity 510. Subcomponents 532, 534, 536, 538, 540, 542, 544, 546 and 548 are formed between plates 512–526. An incompressible liquid 550 is provided in contact with the outer wall 552 of cylinder 505. Thus, the element shown in FIG. 5B corresponds to the embodiment of FIG. 4 except that rather than having a solid surface in contact with outer wall 552, the outer wall 552 is in contact with an incompressible "filling fluid". However, as in FIG. 4, the only free surfaces are on the inner wall. As a result, the embodiment of FIG. 5B operates in a fashion similar to the embodiment of FIG. 4.

A plurality of structures 500 in accordance with the embodiment of FIG. 5B is shown in FIG. 5A arranged in a staggered array, similar to the array shown in the embodiment of FIG. 3. However, the embodiment of FIG. 5A has a filling fluid 550 filling the interstices 560 between the individual cylindrical waveguide structures.

The boundary conditions for FIGS. 5A and 5B are shown in FIG. 11B. For values of κ=1, the boundary conditions of FIG. 11B reduce to the boundary conditions of FIG. 11A.

The embodiments of FIGS. 5A and 5B show insert plates 512–526. Rather than using such plates, it is contemplated that alternating layers of polymeric waveguide material and rigid plates can be employed, as in FIG. 3, but with a filling fluid used between individual cylindrical structures.

For each of the embodiments of FIGS. 1–4, every layer or region (wave guide element) transforms the longitudinal wave into a transverse wave by the deformation in the free lateral surface's direction. Dynamically, the deformation amplitude maximum will occur at the resonance frequency of each layer, which is determined by the layer's Lamé constants and its geometry. The embodiments of FIGS. 1–5B can be tuned to isolate specific frequencies or bands of frequencies in accordance with the method of the present invention which is based on the following theoretical considerations, but which are not limiting in its application herein.

Figure 6:
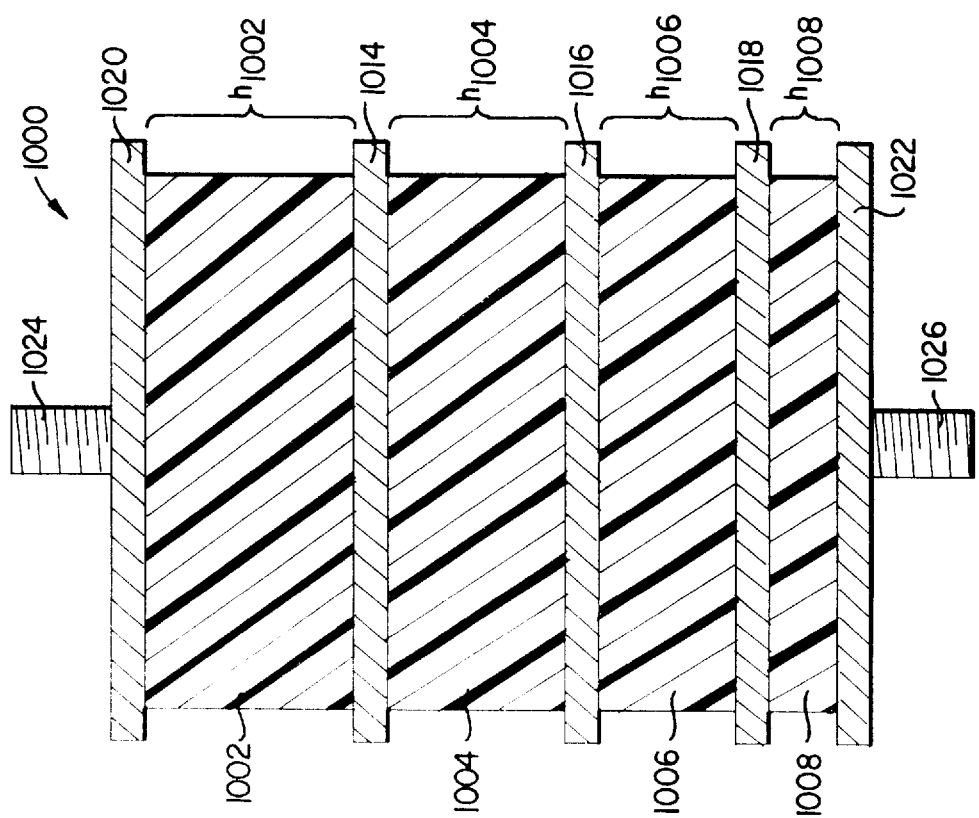
FIG. 6 is a schematic view of a sixth embodiment of a vibration absorbing system in accordance with the present invention showing a stratified solid-elastic shock isolating mount made up of stacked polymeric layers separated by rigid plates.

FIG. 6 shows a stratified solid-elastic shock isolating mount 1000 according to a sixth embodiment of the invention which is made up of a stack of polymeric cylinders 1002, 1004, 1006, 1008 separated by plates 1014, 1016, 1018 and having end caps 1020, 1022 and bolts 1024, 1026. As a result, the stacked cylinders 1002, 1004, 1006, 1008 form layers having heights $h_{1002}$, $h_{1004}$, $h_{1006}$, $h_{1008}$ each of which is tuned to filter out a specific frequency. The device according to the embodiment of FIG. 6 is governed by the boundary conditions of FIG. 10.

Figure 7:
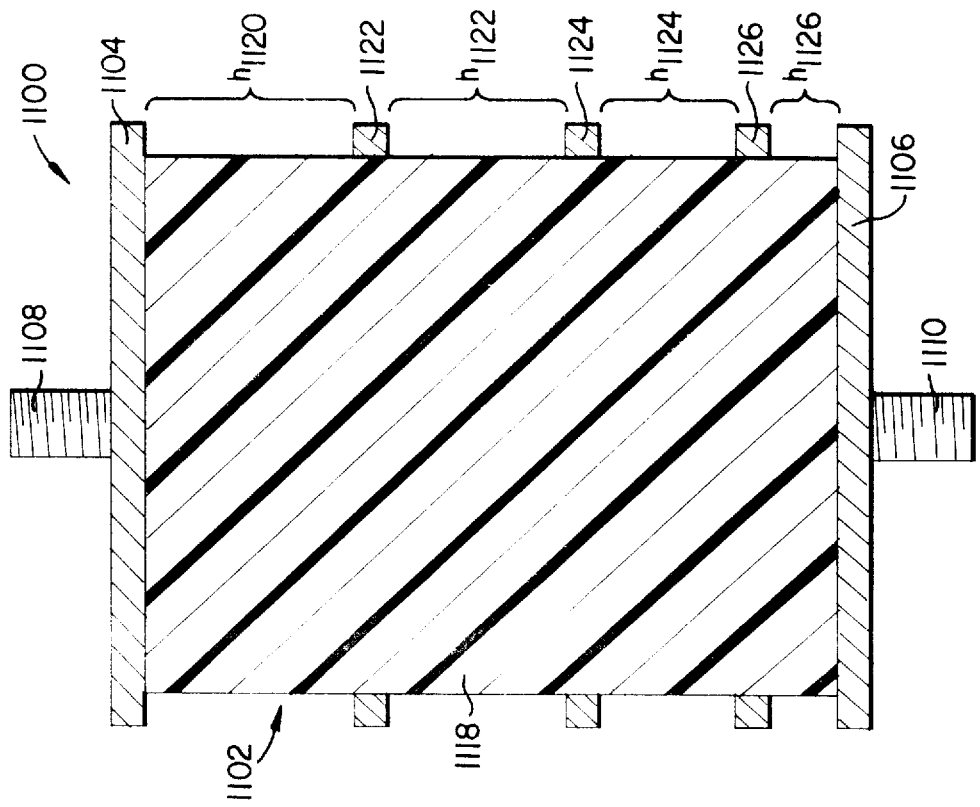
FIG. 7 is a schematic view of a seventh embodiment of a vibration absorbing system in accordance with the present invention showing a stratified solid-elastic shock isolating mount made up of a polymeric cylinder fitted on the outside with annular rings.

FIG. 7 shows a stratified solid-elastic shock isolating mount 1100 according to a seventh embodiment of the invention which is made up of a polymeric cylindrical 1102 having end caps 1104, 1106 and bolts 1108, 1110. A plurality of annular reinforcing rings 1122, 1124, 1126 are fitted to the outer surface 1118 of cylinder 1102. As a result, cylinder 1102 is divided into layers having heights $h_{1120}$, $h_{1122}$, $h_{1124}$, $h_{1126}$, $h_{1126}$, each of which is tuned to filter out of a specific frequency. The device according to the embodiment of FIG. 7 is governed by the boundary conditions of FIG. 10.

Figure 8:
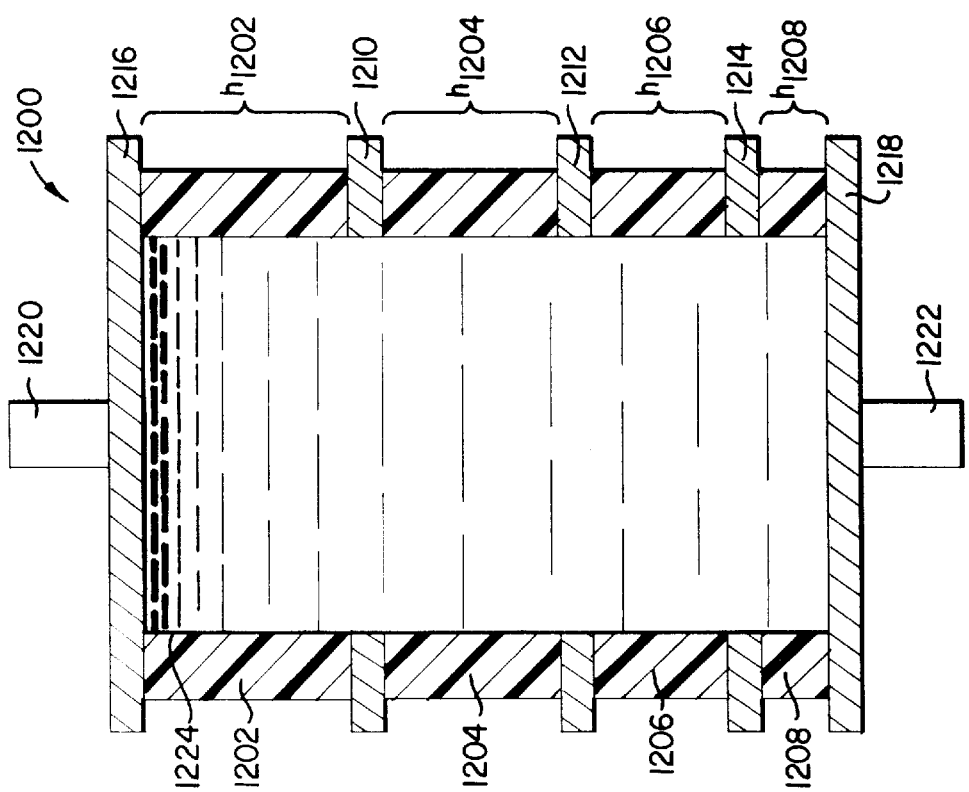
FIG. 8 is a schematic view of an eighth embodiment of a vibration absorbing system in accordance with the present invention showing a stratified liquid-elastic shock isolating mount made up of a stack of ring-shaped polymeric elements separated by ring-shaped polymeric elements separated by rigid plates and forming a cavity filled with a non-controllable liquid.

FIG. 8 shows a stratified liquid-elastic shock isolating mount 1200 according to an eighth embodiment of the invention which is made up of a stack of ring-shaped polymeric members 1202, 1204, 1206, 1208 separated by plates 1210, 1212, 1214 and having end caps 1216, 1218 and bolts 1220, 1222. A cylindrical cavity 1224 is provided in the stacked polymeric members 1202–1208. The cavity 1224 is filled with a non-controllable liquid. As a result, the stacked rings 1202, 1204, 1206, 1208 form layers having heights $h_{1202}$, $h_{1204}$, $h_{1206}$, $h_{1208}$, each of which is tuned to filter out a specific frequency. The device according to FIG. 8 is governed by the boundary conditions of FIG. 10.

Figure 9:
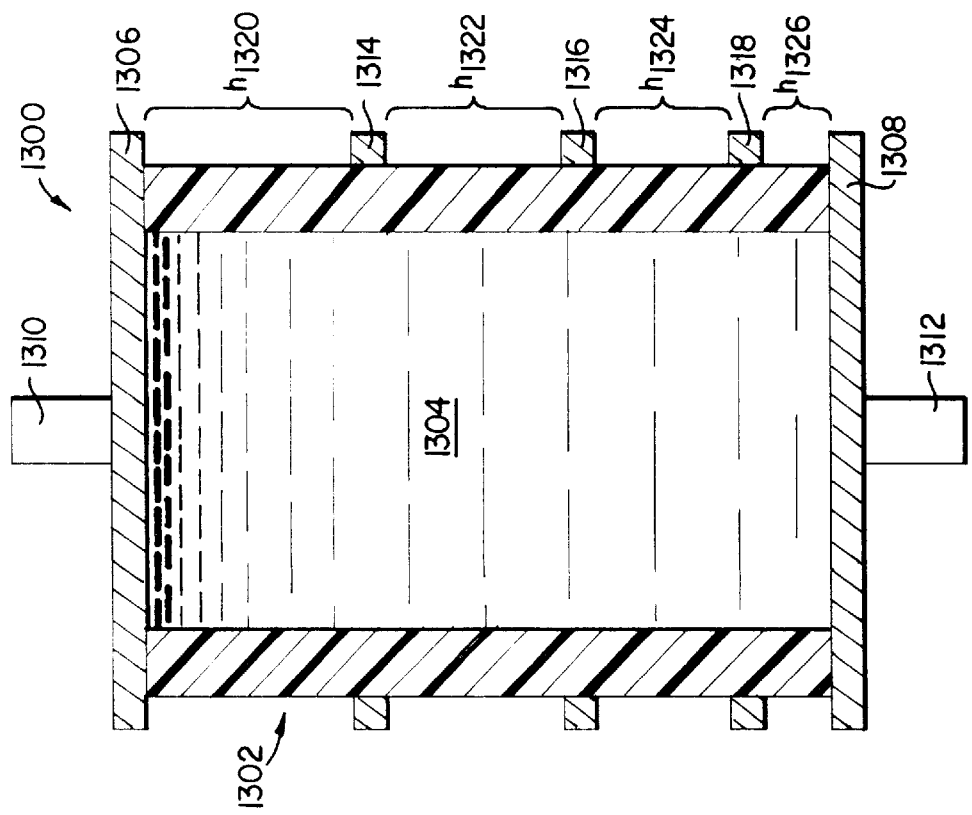
FIG. 9 is a schematic view of a ninth embodiment of a vibration absorbing system in accordance with the present invention showing a stratified liquid-elastic shock isolating mount made up of a polymeric cylinder having a cavity filled with non-controllable liquid and a plurality of ring-shaped reinforcing plates fitted to the outside of the cylinder.

FIG. 9 shows a stratified liquid-elastic mount 1300 according to a ninth embodiment of the invention which is made up of a polymeric cylinder 1302 having a cavity 1304 filled with a non-controllable liquid. Cylinder 1302 has end caps 1306, 1308 and bolts 1310, 1312. A plurality of annular reinforcing rings 1314, 1316, 1318 are fitted to the outer surface 1320 of cylinder 1302. As a result, cylinder 1302 is divided into layers having heights $h_{1320}$, $h_{1322}$, $h_{1324}$, $h_{1326}$, each of which is tuned to filter out a specific frequency. The device according to the embodiment of FIG. 9 is governed by the boundary conditions of FIG. 10.

The four embodiments of FIGS. 6–9 are broad band mounts of variable stiffness. They are multilayered, reinforced structure incorporating the principles of the stratified, liquid-elastic waveguide. The inner cavity is filled with a non-controllable liquid, which may be viscous and the external reinforcing rings are placed at precise locations so that each layer is tuned to absorb a particular frequency range.

Figure 16:
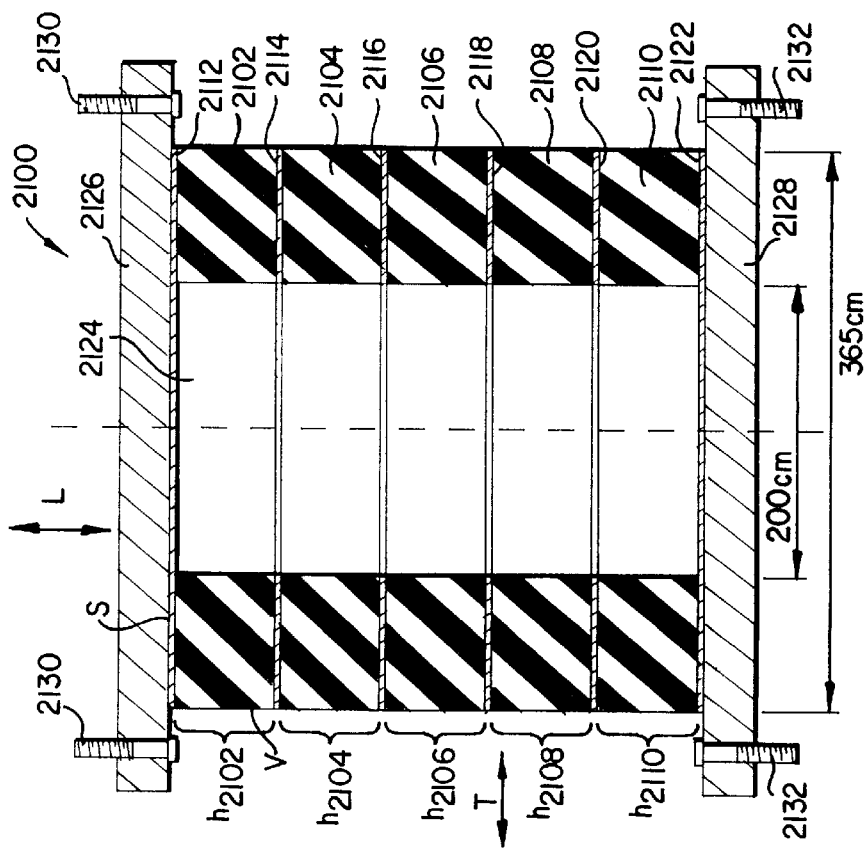
FIG. 16 is a schematic illustration of a liquid-elastic earthquake-resistant foundation element.

FIG. 16 illustrates a liquid-elastic earthquake-resistant foundation element 2100. It is a periodic, rubber-steel laminate structure. The dynamic properties of the natural rubber compound were disclosed in the patent application entitled "Method and Apparatus of Elastic Wave Filtration," Ser. No. 08/551,655, filed Nov. 1, 1995. The pictured element has five annular rubber layers 2102, 2104, 2106, 2108, 2110, having heights $h_{2102}$, $h_{2104}$, $h_{2106}$, $h_{2108}$, $h_{2110}$, each of which is 60 cm in height. The six reinforcing steel plates 2112, 2114, 2116, 2118, 2120, 2122 are 5 cm in height. The perforation factor $$\epsilon^2 = \left(\frac{r_0}{r_1}\right)^2 = 0.3,$$

establishes the relationship between the inner and outer radii. The annular layers 2102–2110 form a cylindrical inner cavity 2124. The inner cavity 2124, is filled with water or a viscous liquid.

End plates 2126, 2128, have respective mounting bolts 2130, 2132 are disposed at the top and bottom of the foundation element 2100. As a consequence, the annular rubber layers 2102–2110 are supported along their torsional surfaces S and are free to vibrate in the transverse direction T along their outer surfaces V.

Figure 18A:
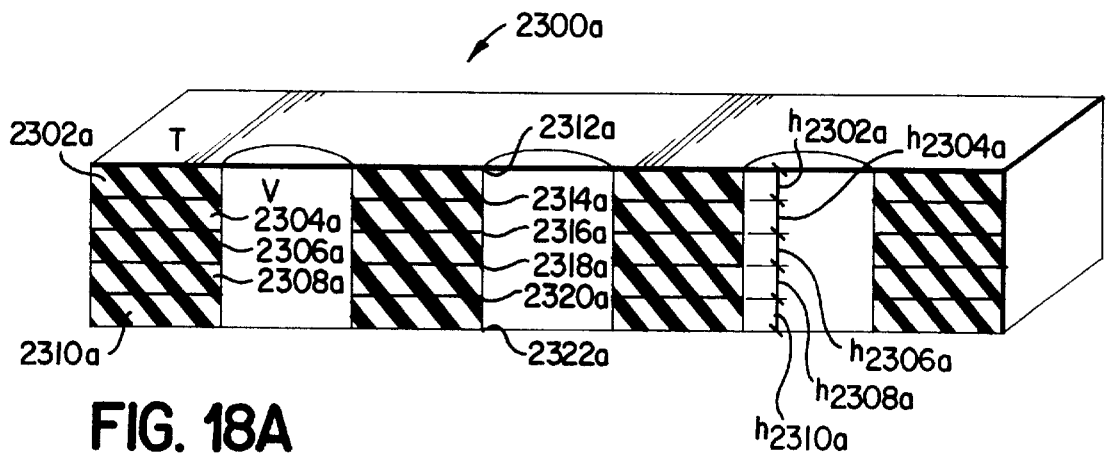
FIGS. 18A and 18B are a schematic illustration of the cross section of an earthquake-resistant pad element. Both steel insert and laminate designs are shown.
Figure 18B:
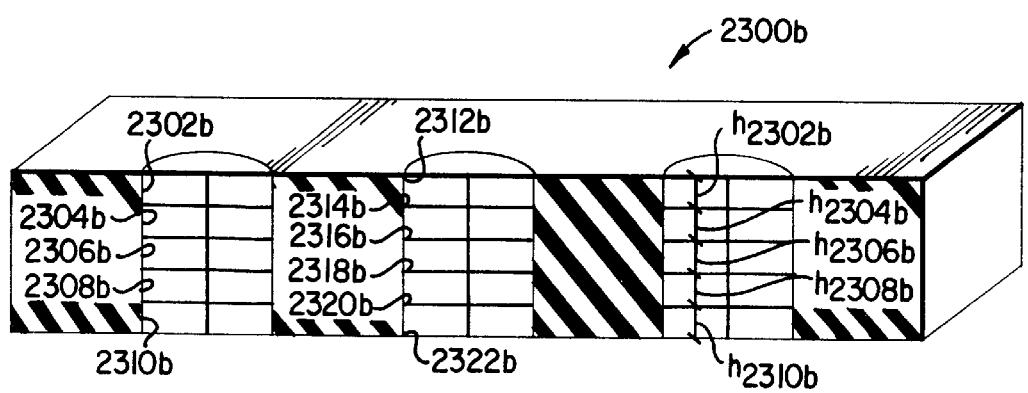
Figure 17:
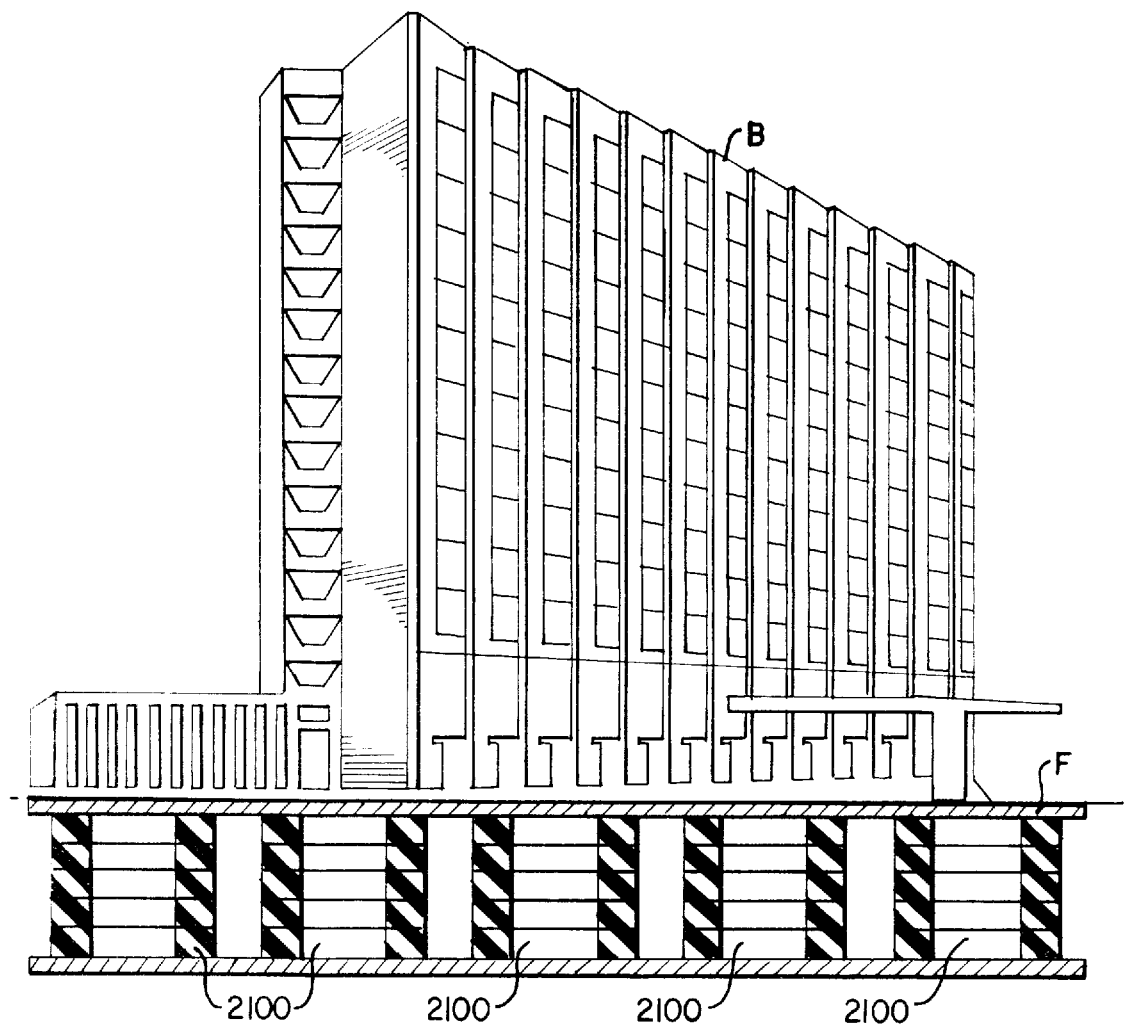
FIG. 17 is a schematic illustration of an array of liquid-elastic, earthquake-resistant foundation elements positioned beneath a building.

FIG. 17 illustrates a series of the liquid-elastic earthquake-resistant foundation elements 2100 of FIG. 16 connected and placed under a high-rise building B foundation F. FIGS. 18a and 18b each illustrate a cross-sectional view of an earthquake-resistant pad element.

FIG. 18a illustrates a laminate design in which layers of rubber material are separated by steel plates, with a plurality of cylindrical cavities formed thereon. Specifically, foundation element 2300a is made up of rubber layers 2302a, 2304a, 2306a, 2308a, 2310a, having heights $h_{2302a}$, $h_{2304a}$, $h_{2306a}$, $h_{2308a}$, $h_{2310a}$, separated by plates 2312a, 2314a, 2316a, 2318a, 2320a, 2322a. As a consequence, the layers 2302a–2310a are reinforced along their torsional surfaces S and free to vibrate in the transverse direction T along their free surfaces V.

Similarly, FIG. 18b illustrates a design in which a steel plate insert divides the free surface of a rubber material and defines the heights of the layers of the rubber material. Specifically, foundation element 2300b is made up of rubber regions 2302b, 2304b, 2306b, 2308b, 2310b, having heights $h_{2302b}$, $h_{2304b}$, $h_{2306b}$, $h_{2308b}$, $h_{2310b}$, with node points defined by plates 2312b, 2314b, 2316b, 2318b, 2320b, 2322b. As a consequence, the regions 2302b–2310b behave as if they were reinforced along their torsional surfaces S and free to vibrate along their outer surfaces V.

Figure 19:
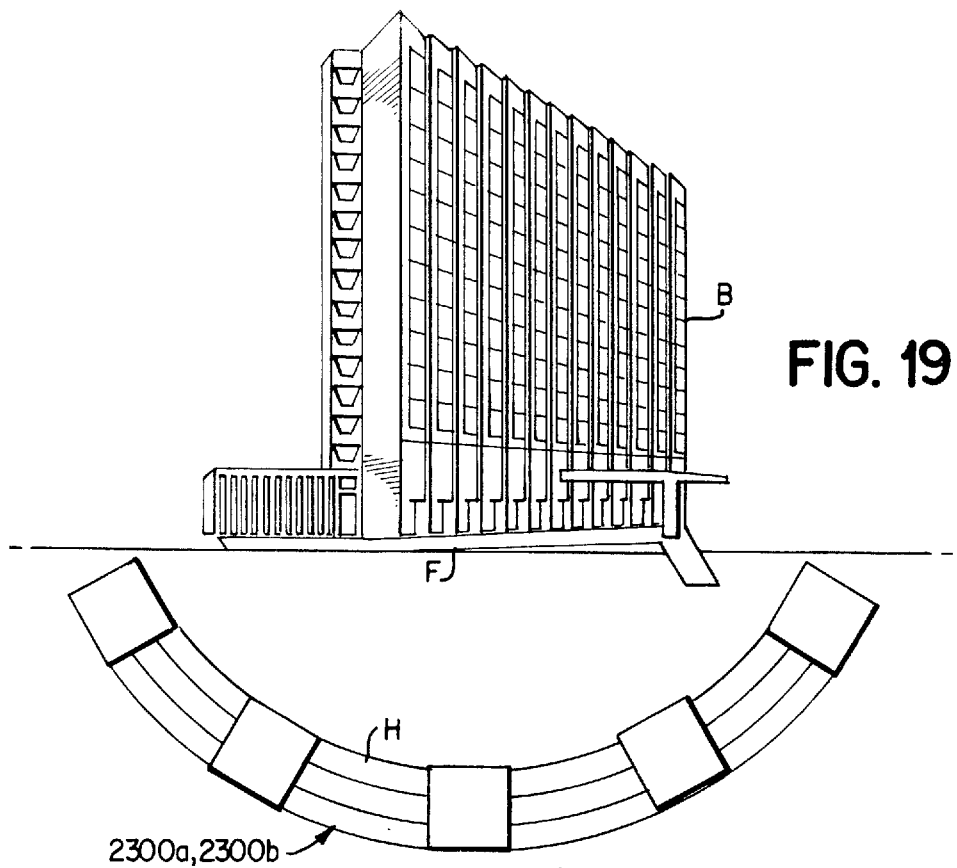
FIG. 19 is a schematic illustration of a multilayered foundation pad with air-filled cylindrical channels. The device is positioned beneath a building.
Figure 20:
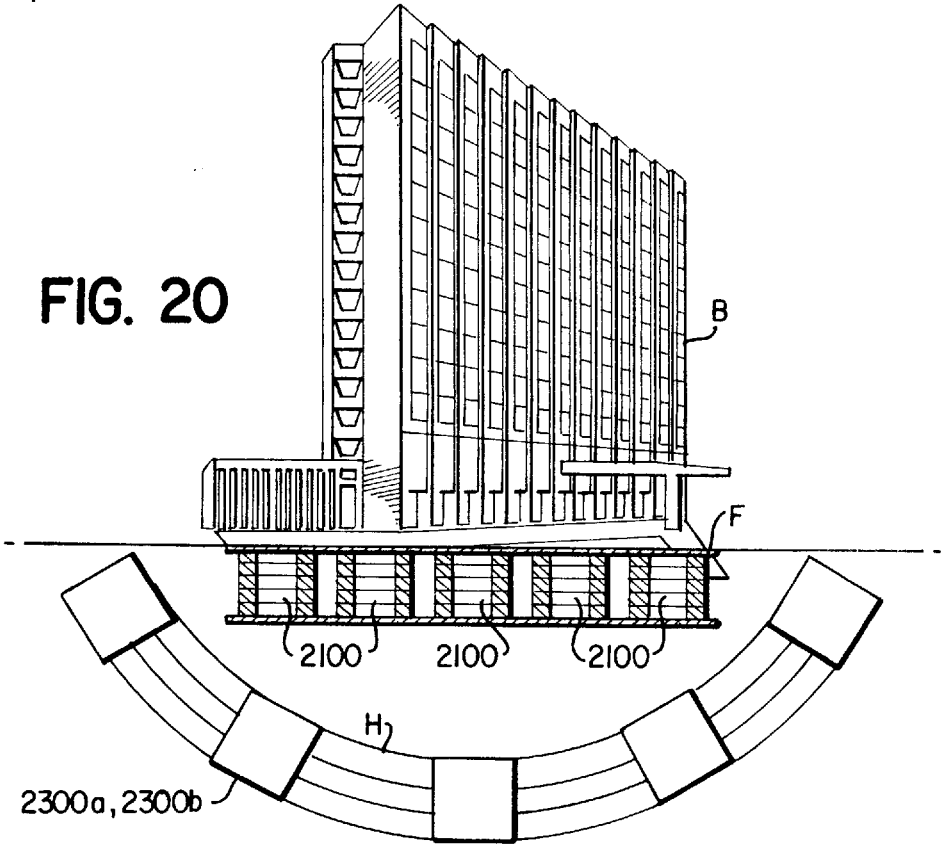
FIG. 20 is a schematic illustration of an earthquake-resistant system comprising of an array of liquid-elastic elements and a multilayered foundation pad.

Both the laminate design and the design incorporating a steel insert equally satisfy the fundamental boundary conditions, and their efficiencies are equivalent, cf. Method and Apparatus of Elastic Wave Filtration, Ser. No. 08/551, 655, filed Nov. 1, 1995. Because it is well known that seismic waves propagate at all angles, and even have a significant horizontal component, the design in FIG. 19 is presented. In this embodiment, the seismic waves are isolated from the building or structure at all angles. The building rests on a concrete hemisphere H which rests on a multilayered earthquake-resistant pad 2300a or 2300b with cylindrical channels, as shown in FIGS. 18a and 18b. The pad 2300a, 2300b isolates the building B and concrete foundation F from the earth. The figure represents a five-layered natural rubber structure. Each layer is 60 cm in height and reinforced by 5 cm thick steel plates. The inner radius is 100 cm, $\epsilon^2=0.3$ and $\kappa^2=1$. Alternatively, optimal protection against an earthquake is illustrated in FIG. 20. Redundancy is incorporated into the design to mitigate the effects of a large seismic disturbance by using a combination of foundation elements 2100 and 2300a, 2300b.

Figure 21A:
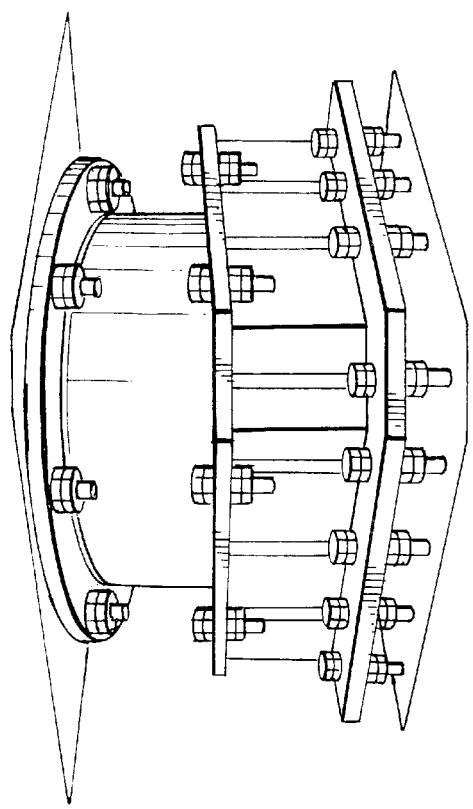
FIGS. 21A and 21B are a representative illustration of the prior art, a Menshin device developed by Bridgestone Co. Ltd. and Kajima Constructions Ltd.
Figure 21B:
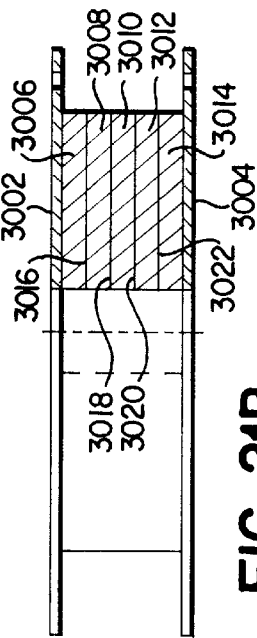

FIGS. 21A and 21B illustrate the design of a Menshin structure (See *Technological Development of Earthquake-resistant Structures,* Dr. V. S. Kothekar, Ed., A.A. Balkema Publishers, Rotterdam/Brookfield, Vt., 1993., p. 228) which is used universally for protecting buildings from the effects of earthquakes. FIGS. 21A and 21B show a multirubber bearing of laminated rubber for vibration prevention and Menshin applications. The aim of development of the bearing of FIGS. 21A and 21B is to prevent vibrations due to traffic, in a building and at the same time to obtain a Menshin effect during large earthquakes. The bearing of FIGS. 21A and 21B was developed by Bridgestone Co. Ltd. and Kajima Constructions Ltd. and examples of use or tests are Kajima Constructions Ltd., Technical Research Center, Acoustic and Environmental Vibrations, Test Wing. FIG. 21B shows a bearing 3000 having flanges 3002, 3004, with layers of rubber 3006, 3008, 3010, 3012, 3014, separated by steel plates 3016, 3018, 3020, 3022. FIG. 22 demonstrates the results of Menshin tests. Ibid., p. 414 Two cases are considered here: one where the foundation is fixed and the other where the Menshin technique is used. For frequencies up to 20 Hz, the ratio of the magnitude of vertical vibrations of the roof to the magnitude of vertical vibrations of the ground is based on an excitation machine installed in the basement of a neighboring building. For still higher frequencies, these ratios are based on the impact of an impulse hammer. For this test, the Menshin structures were fitted at the foundation of Kajima Constructions Technical Research Laboratory Building in Chofu City, Tokyo, Japan.

For comparative purposes, FIG. 23 illustrates the performance of the invention. According to records, the mass of the aforementioned building at the time of the experiment was two-thousand (2000) metric tons. An earthquake response spectrum is shown in FIG. 24. Referring to the comparative response shown in FIG. 23, one will notice several advantages over the prior art for the following reasons:

1. Greater Vibration Isolation over a broad frequency range.
2. Amplification or system resonance is shifted to lower frequency, i.e. $f_0 = 5$ Hz for Menshin structure vs. $f_0 < 2$ Hz for said invention.
3. The aforementioned effect would be highly desirable in the case of an earthquake whose spectrum in defined by that of FIG. 24. (Ibid., p. 404.) In this case, a maximum of generated acceleration occurs in the vicinity of 5 Hz which coincides with the resonance of the Menshin system.
4. The invention is tunable and can be optimized for regions with various seismic profiles and history.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A method of absorbing seismic waves emanating from a source of seismic excitation so as to protect a structure to be protected comprised of the steps of:
   selecting frequencies to be filtered, said frequencies being characteristic of frequencies generated during an earthquake;
   interposing a plurality of layers of elastic waveguide materials between the seismic excitation source and the structure to be protected, each said layer being free to vibrate in the transverse direction;
   assigning individual layers to filter individual selected frequencies by selecting a specific elastic waveguide material and a geometric factor in the form of a ratio of the transverse dimension to the longitudinal dimension for the individual layer;
   whereby the elastic waveguide material and the geometric factor cooperate so that each said layer will convert a longitudinal wave of the selected frequency to a transverse wave at the selected frequency, thereby filtering the selected frequency, and each said layer will pass longitudinal waves of non-selected frequencies to successive layers of elastic waveguide materials.

2. A method of absorbing seismic waves emanating from a source of seismic excitation so as to protect a structure to be protected comprised of the steps of:
   (a) selecting at least one frequency to be filtered, said frequency being characteristic of a frequency generated during an earthquake;
   (b) selecting a specific elastic waveguide material;
   (c) interposing at least one layer of said elastic waveguide material between the seismic excitation source and the structure to be protected, said layer having a longitudinal dimension and a transverse dimension, said layer being free to vibrate in the transverse direction; and
   (d) selecting a geometric factor in the form of a ratio of the transverse dimension to the longitudinal dimension for the layer of elastic waveguide material;
   whereby the elastic waveguide material and the geometric factor cooperate so that said layer will convert a longitudinal wave of the selected frequency to a transverse wave at the selected frequency, thereby filtering the selected frequency, and said layer will pass longitudinal waves of non-selected frequencies;
   (e) repeating steps (a)–(d) for additional selected frequencies to be filtered.

3. An apparatus for absorbing seismic waves emanating from a source of seismic excitation so as to protect a structure to be protected comprising:
   a plurality of layers of elastic waveguide materials to be interposed between the seismic excitation source and the structure to be protected, each said layer having a longitudinal dimension and a transverse dimension, each said layer being free to vibrate in the transverse direction, each said layer comprising:
      a specific elastic waveguide material and having a geometric factor in the form of a ratio of the transverse dimension to the longitudinal dimension for the individual layer;
      wherein said elastic waveguide material and said geometric factor cooperate so that each said layer will convert a longitudinal wave of a selected frequency to a transverse wave at the selected frequency, thereby filtering the selected frequency, and each said layer will pass longitudinal waves of non-selected frequencies to successive layers of elastic waveguide materials.

4. An apparatus for absorbing seismic waves emanating from a source of seismic excitation so as to protect a structure to be protected comprising:
   at least one layer of elastic waveguide material to be interposed between the seismic excitation source and the structure to be protected, said layer having a longitudinal dimension and a transverse dimension, said layer being free to vibrate in the transverse direction, and having a geometric factor in the form of a ratio of the transverse dimension to the longitudinal dimension for the layer;
   wherein said elastic waveguide material and said geometric factor cooperate so that said layer will convert a longitudinal wave of a selected frequency to a transverse wave at the selected frequency, thereby filtering the selected frequency, and said layer will pass longitudinal waves of non-selected frequencies.

5. A method of absorbing seismic waves emanating from a source of seismic excitation so as to protect a structure to be protected comprised of the steps of:

selecting frequencies to be filtered, said frequencies being characteristic of frequencies generated during an earthquake;

interposing a plurality of layers of elastic waveguide materials between the seismic excitation source and the structure to be protected, each said layer having a longitudinal dimension and a transverse dimension, each said layer being free to vibrate in the transverse direction;

assigning individual layers to filter individual selected frequencies by selecting a specific elastic waveguide material and a geometric factor in the form of a ratio of the transverse dimension to the longitudinal dimension for the individual layer;

wherein the relationship between the properties of the elastic waveguide material, the geometric factor and the selected frequency are governed by the equation $$\omega = \frac{m \cdot \pi}{h} \cdot \sqrt{\frac{\mu}{\rho}} \cdot \sqrt{\frac{q_4}{q_3} \cdot \frac{m^2\pi^2 + q_1 \cdot \left(\frac{h}{r_0}\right)^2}{m^2\pi^2 + \frac{q_2 \cdot q_4}{q_3} \cdot \left(\frac{h}{r_0}\right)^2}}$$

where $\omega$ is an eigenfrequency m is a modal factor $\mu$ is a dynamic shear modulus of said elastic waveguide material $\rho$ is a density of said elastic waveguide material $q_1 = \frac{24}{1+\epsilon^2}$ is a dimensionless constant $q_2 = \frac{8}{1-\epsilon^4}$ is a dimensionless constant $q_3 = \frac{8}{1-\epsilon^4}$ is a dimensionless constant $q_4 = 8$ is a dimensionless constant $\epsilon$ is a perforation factor $\frac{h}{r_0}$ is the geometric factor;

whereby the elastic waveguide material and geometric factor cooperate so that each said layer will convert a longitudinal wave of the selected frequency to a transverse wave at the selected frequency, thereby filtering the selected frequency, and each said layer will pass longitudinal waves of non-selected frequencies to successive layers of elastic waveguide materials.

6. A method of absorbing seismic waves emanating from a source of seismic excitation so as to protect a structure to be protected comprised of the steps of:

(a) selecting at least one frequency to be filtered, said frequency being characteristic of a frequency generated during an earthquake;

(b) selecting a specific elastic waveguide material;

(c) interposing at least one layer of said elastic waveguide material between the seismic excitation source and the structure to be protected, said layer having a longitudinal dimension and a transverse dimension, said layer being free to vibrate in the transverse direction; and (d) selecting a geometric factor in the form of a ratio of the transverse dimension to the longitudinal dimension for the layer of elastic waveguide material;

wherein the relationship between the properties of the elastic waveguide material, the geometric factor and the selected frequency are governed by the equation $$\omega = \frac{m \cdot \pi}{h} \cdot \sqrt{\frac{\mu}{\rho}} \cdot \sqrt{\frac{q_4}{q_3} \cdot \frac{m^2\pi^2 + q_1 \cdot \left(\frac{h}{r_0}\right)^2}{m^2\pi^2 + \frac{q_2 \cdot q_4}{q_3} \cdot \left(\frac{h}{r_0}\right)^2}}$$

where $\omega$ is an eigenfrequency m is a modal factor $\mu$ is a dynamic shear modulus of said elastic waveguide material $\rho$ is a density of said elastic waveguide material $q_1 = \frac{24}{1+\epsilon^2}$ is a dimensionless constant $q_2 = \frac{8}{1-\epsilon^4}$ is a dimensionless constant $q_3 = \frac{8}{1-\epsilon^4}$ is a dimensionless constant $q_4 = 8$ is a dimensionless constant $\epsilon$ is a perforation factor $\frac{h}{r_0}$ is the geometric factor;

whereby the elastic waveguide material and geometric factor cooperate so that said layer will convert a longitudinal wave of the selected frequency to a transverse wave at the selected frequency, thereby filtering the selected frequency, and said layer will pass longitudinal waves of non-selected frequencies;

(e) repeating steps (a)–(d) for additional selected frequencies to be filtered.

7. An apparatus for absorbing seismic waves emanating from a source of seismic excitation so as to protect a structure to be protected comprised of:

a plurality of layers of elastic waveguide materials to be interposed between the seismic excitation source and the structure to be protected, each said layer having a longitudinal dimension and a transverse dimension, each said layer being free to vibrate in the transverse direction, each said layer comprising:

a specific elastic waveguide material and having a geometric factor in the form of a ratio of the transverse dimension to the longitudinal dimension for the individual layer;

wherein the relationship between the properties of the elastic waveguide material, the geometric factor and the selected frequency are governed by the equation $$\omega = \frac{m \cdot \pi}{h} \cdot \sqrt{\frac{\mu}{\rho}} \cdot \sqrt{\frac{q_4}{q_3} \cdot \frac{m^2\pi^2 + q_1 \cdot \left(\frac{h}{r_0}\right)^2}{m^2\pi^2 + \frac{q_2 \cdot q_4}{q_3} \cdot \left(\frac{h}{r_0}\right)^2}}$$

where $\omega$ is an eigenfrequency m is a modal factor $\mu$ is a dynamic shear modulus of said elastic waveguide material $\rho$ is a density of said elastic waveguide material $q_1 = \frac{24}{1 + \epsilon^2}$ is a dimensionless constant $q_2 = \frac{8}{1 - \epsilon^4}$ is a dimensionless constant $q_3 = \frac{8}{1 - \epsilon^4}$ is a dimensionless constant $q_4 = 8$ is a dimensionless constant $\epsilon$ is a perforation factor $\frac{h}{r_0}$ is the geometric factor;

whereby the elastic waveguide material and geometric factor cooperate so that each said layer will convert a longitudinal wave of the selected frequency to a transverse wave at the selected frequency, thereby filtering the selected frequency, and each said layer will pass longitudinal waves of non-selected frequencies to successive layers of elastic waveguide materials.

8. An apparatus for absorbing seismic waves emanating from a source of seismic excitation so as to protect a structure to be protected comprised of:

at least one layer of elastic waveguide material to be interposed between the seismic excitation source and the structure to be protected, said layer having a longitudinal dimension and a transverse dimension, said layer being free to vibrate in the transverse direction, and having a geometric factor in the form of a ratio of the transverse dimension to the longitudinal dimension for the layer;

wherein the relationship between the properties of the elastic waveguide material, the geometric factor and the selected frequency are governed by the equation $$\omega = \frac{m \cdot \pi}{h} \cdot \sqrt{\frac{\mu}{\rho}} \cdot \sqrt{\frac{q_4}{q_3} \cdot \frac{m^2\pi^2 + q_1 \cdot \left(\frac{h}{r_0}\right)^2}{m^2\pi^2 + \frac{q_2 \cdot q_4}{q_3} \cdot \left(\frac{h}{r_0}\right)^2}}$$

where $\omega$ is an eigenfrequency m is a modal factor $\mu$ is a dynamic shear modulus of said elastic waveguide material $\rho$ is a density of said elastic waveguide material $q_1 = \frac{24}{1 + \epsilon^2}$ is a dimensionless constant $q_2 = \frac{8}{1 - \epsilon^4}$ is a dimensionless constant $q_3 = \frac{8}{1 - \epsilon^4}$ is a dimensionless constant $q_4 = 8$ is a dimensionless constant $\epsilon$ is a perforation factor $\frac{h}{r_0}$ is the geometric factor;

whereby the elastic waveguide material and geometric factor cooperate so that each said layer will convert a longitudinal wave of the selected frequency to a transverse wave at the selected frequency, thereby filtering the selected frequency, and each said layer will pass longitudinal waves of non-selected frequencies to successive layers of elastic waveguide materials.

9. A method of absorbing seismic waves emanating from a source of seismic excitation so as to protect a structure to be protected comprised of the steps of:

selecting frequencies to be filtered, said frequencies being characteristic of frequencies generated during an earthquake;

interposing a plurality of regions of elastic waveguide materials between the seismic excitation source and the structure to be protected, each said layer having a longitudinal dimension and a transverse dimension, each said layer being free to vibrate in the transverse direction;

assigning individual regions to filter individual selected frequencies by selecting a specific elastic waveguide material and a geometric factor in the form of a ratio of the transverse dimension to the longitudinal dimension for the individual layer;

whereby the elastic waveguide material and geometric factor cooperate so that each said region will convert a longitudinal wave of the selected frequency to a transverse waved at the selected frequency, thereby filtering the selected frequency, and each said region will pass longitudinal waves of non-selected frequencies to successive regions of elastic waveguide materials.

10. An apparatus for absorbing seismic waves emanating from a source of seismic excitation so as to protect a structure to be protected comprising:

a plurality of regions of elastic waveguide materials to be interposed between the seismic excitation source and the structure to be protected, each said region having a longitudinal dimension and a transverse dimension, each said region being free to vibrate in the transverse direction, each said region comprising:

a specific elastic waveguide material and having a geometric factor in the form of a ratio of the transverse dimension to the longitudinal dimension for the individual region;

wherein said elastic waveguide material and said geometric factor cooperate so that each said region will convert a longitudinal wave of a selected frequency to a transverse wave at the selected frequency, thereby filtering the selected frequency, and each said region will pass longitudinal waves of non-selected frequencies to successive regions of elastic waveguide materials.

11. A method of absorbing seismic waves emanating from a source of seismic excitation so as to protect a structure to be protected comprised of the steps of:

selecting frequencies to be filtered, said frequencies being characteristic of frequencies generated during an earthquake;

interposing a plurality of layers of elastic waveguide materials between the seismic excitation source and the structure to be protected, each said layer having a longitudinal dimension and a transverse dimension, each said layer being free to vibrate in the transverse direction;

assigning individual layers to filter individual selected frequencies by selecting a specific elastic waveguide material and a geometric factor in the form of a ratio of the transverse dimension to the longitudinal dimension for the individual layer;

wherein the relationship between the properties of the elastic waveguide material, the geometric factor and the selected frequency are governed by the equation $$\omega = \frac{m \cdot \pi}{h} \cdot \sqrt{\frac{\mu}{\rho}} \cdot \sqrt{\frac{q_4}{q_3} \cdot \frac{m^2\pi^2 + q_1 \cdot \left(\frac{h}{r_0}\right)^2}{m^2\pi^2 + \frac{q_2 \cdot q_4}{q_3} \cdot \left(\frac{h}{r_0}\right)^2}}$$

where
- $\omega$ is an eigenfrequency
- m is a modal factor
- $\mu$ is a dynamic shear modulus of said elastic waveguide material
- $\rho$ is a density of said elastic waveguide material
- $\epsilon$ is a perforation factor
- $h/r_0$ is the geometric factor;
- k is a filling factor, and
- $q_1, q_2, q_3$ and $q_4$ are dimensionless factors defined by:

$$q_1 = \frac{a}{b} = \frac{8(1 - \epsilon^2) \cdot (1 + 3\epsilon^2 \kappa^4)}{4(\epsilon\kappa)^2 \cdot \left[1 - \frac{(\epsilon\kappa)^2}{4}\right] - 4 \cdot \ln(\epsilon) - 4\kappa^2 + \kappa^4}$$

$$q_2 = \frac{c}{b} = \frac{8(\epsilon\kappa)^2 \cdot (1 - (\epsilon\kappa)^2)}{4(\epsilon\kappa)^2 \cdot \left[1 - \frac{(\epsilon\kappa)^2}{4}\right] - 4 \cdot \ln(\epsilon) - 4\kappa^2 + \kappa^4}$$

$$q_3 = \frac{1}{b} = \frac{8(\epsilon\kappa)^2}{4(\epsilon\kappa)^2 \cdot \left[1 - \frac{(\epsilon\kappa)^2}{4}\right] - 4 \cdot \ln(\epsilon) - 4\kappa^2 + \kappa^4}$$

$$q_4 = \frac{1}{d} = \frac{8(\epsilon\kappa)^2}{4(\epsilon\kappa)^2 \cdot \left[1 - \frac{(\epsilon\kappa)^2}{4}\right] - 4 \cdot \ln(\epsilon\kappa) - 3}$$

whereby the elastic waveguide material and geometric factor cooperate so that each said region will convert a longitudinal wave of the selected frequency to a transverse wave at the selected frequency, thereby filtering the selected frequency, and each said region will pass longitudinal waves of non-selected frequencies to successive regions of elastic waveguide materials.

12. An apparatus for absorbing seismic waves emanating from a source of seismic excitation so as to protect a structure to be protected comprising:

a plurality of regions of elastic waveguide materials to be interposed between the seismic excitation source and the structure to be protected, each said region having a longitudinal dimension and a transverse dimension, each said region being free to vibrate in the transverse direction, each said region comprising:

a specific elastic waveguide material and a geometric factor in the form of a ratio of the transverse dimension to the longitudinal dimension for the individual region;

wherein the relationship between the properties of the elastic waveguide material, the geometric factor and the selected frequency are governed by the equation $$\omega = \frac{m \cdot \pi}{h} \cdot \sqrt{\frac{\mu}{\rho}} \cdot \sqrt{\frac{q_4}{q_3} \cdot \frac{m^2\pi^2 + q_1 \cdot \left(\frac{h}{r_0}\right)^2}{m^2\pi^2 + \frac{q_2 \cdot q_4}{q_3} \cdot \left(\frac{h}{r_0}\right)^2}}$$

where
- $\omega$ is an eigenfrequency
- m is a modal factor
- $\mu$ is a dynamic shear modulus of said elastic waveguide material
- $\rho$ is a density of said elastic waveguide material
- $\epsilon$ is a perforation factor
- $h/r_0$ is the geometric factor;
- k is a filling factor, and
- $q_1, q_2, q_3$ and $q_4$ are dimensionless factors defined by:

$$q_1 = \frac{a}{b} = \frac{8(1 - \epsilon^2) \cdot (1 + 3\epsilon^2 \kappa^4)}{4(\epsilon\kappa)^2 \cdot \left[1 - \frac{(\epsilon\kappa)^2}{4}\right] - 4 \cdot \ln(\epsilon) - 4\kappa^2 + \kappa^4}$$

$$q_2 = \frac{c}{b} = \frac{8(\epsilon\kappa)^2 \cdot (1 - (\epsilon\kappa)^2)}{4(\epsilon\kappa)^2 \cdot \left[1 - \frac{(\epsilon\kappa)^2}{4}\right] - 4 \cdot \ln(\epsilon) - 4\kappa^2 + \kappa^4}$$

$$q_3 = \frac{1}{b} = \frac{8(\epsilon\kappa)^2}{4(\epsilon\kappa)^2 \cdot \left[1 - \frac{(\epsilon\kappa)^2}{4}\right] - 4 \cdot \ln(\epsilon) - 4\kappa^2 + \kappa^4}$$

$$q_4 = \frac{1}{d} = \frac{8(\epsilon\kappa)^2}{4(\epsilon\kappa)^2 \cdot \left[1 - \frac{(\epsilon\kappa)^2}{4}\right] - 4 \cdot \ln(\epsilon\kappa) - 3}$$

wherein said elastic waveguide material and geometric factor cooperate so that each said region will convert a longitudinal wave of the selected frequency to a transverse wave at the selected frequency, thereby filtering the selected frequency, and each said region will pass longitudinal waves of non-selected frequencies to successive regions of elastic waveguide materials.

13. A method as in claims 1, 2, 5, 6 or 11, wherein the plurality of layers are arranged in building mounts located between a foundation of the structure and the earth.

14. A method as in claims 1, 2, 5, 6 or 11, wherein the plurality of layers are arranged on a hemisphere having a concave surface directed toward said structure, said hemisphere buried between a foundation of said structure and the source of seismic excitation.

15. A method as in claim 9, wherein the plurality of regions are arranged in building mounts located between a foundation of the structure and the earth.

16. A method as in claim 9, wherein the plurality of regions are arranged on a hemisphere having a concave surface directed toward said structure, said hemisphere burried between a foundation of said structure and the source of seismic excitation.

17. An apparatus as in claims 3, 4, 7 or 8, wherein the plurality of layers are arranged in building mounts located between a foundation of the structure and the earth.

18. An apparatus as in claims 3, 4, 7 or 8, wherein the plurality of layers are arranged on a hemisphere having a concave surface directed toward said structure, said hemisphere buried between a foundation of said structure and the source of seismic excitation.

19. An apparatus as in claims 10 or 12, wherein the plurality of regions are arranged in building mounts located between a foundation of the structure and the earth.

20. An apparatus as in claims 10 or 12, wherein the plurality of regions are arranged on a hemisphere having a concave surface directed toward said structure, said hemisphere buried between a foundation of said structure and the source of seismic excitation.

* * * * *